(12) United States Patent
Tsukamoto et al.

(10) Patent No.: US 12,463,971 B2
(45) Date of Patent: Nov. 4, 2025

(54) DETECTION DEVICE, DETECTION METHOD, AND DETECTION PROGRAM

(71) Applicants: Sumitomo Electric Industries, Ltd., Osaka (JP); Sumitomo Wiring Systems, Ltd., Yokkaichi (JP); AutoNetworks Technologies, Ltd., Yokkaichi (JP)

(72) Inventors: Hiroyuki Tsukamoto, Osaka (JP); Hiroshi Ueda, Yokkaichi (JP)

(73) Assignees: Sumitomo Electric Industries, Ltd., Osaka (JP); Sumitomo Wiring Systems, Ltd., Yokkaichi (JP); AutoNetworks Technologies, Ltd., Yokkaichi (JP)

( * ) Notice: Subject to any disclaimer, the term of this patent is extended or adjusted under 35 U.S.C. 154(b) by 234 days.

(21) Appl. No.: 18/265,441

(22) PCT Filed: Sep. 8, 2021

(86) PCT No.: PCT/JP2021/032961
§ 371 (c)(1),
(2) Date: Jun. 6, 2023

(87) PCT Pub. No.: WO2022/137661
PCT Pub. Date: Jun. 30, 2022

(65) Prior Publication Data
US 2024/0114028 A1 Apr. 4, 2024

(30) Foreign Application Priority Data
Dec. 25, 2020 (JP) .................. 2020-216834

(51) Int. Cl.
*H04L 9/40* (2022.01)
*G07C 5/00* (2006.01)

(52) U.S. Cl.
CPC .............. *H04L 63/10* (2013.01); *G07C 5/008* (2013.01)

(58) Field of Classification Search
None
See application file for complete search history.

(56) References Cited

U.S. PATENT DOCUMENTS

| 10,630,699 B2* | 4/2020 | Galula ................ H04L 63/1416 |
| 10,880,415 B2* | 12/2020 | Hamada ............. H04L 63/1466 |

(Continued)

FOREIGN PATENT DOCUMENTS

| EP | 3142289 A1 | 3/2017 |
| JP | 2014-146868 A | 8/2014 |

(Continued)

*Primary Examiner* — Kaveh Abrishamkar
(74) *Attorney, Agent, or Firm* — XSENSUS LLP

(57) ABSTRACT

A detection device includes: a monitoring unit configured to monitor a periodic message and an event message as messages in an in-vehicle network, each message having, assigned thereto, identification information of a transmission source and a sequence number; a counter unit configured to change a counter value corresponding to the identification information, when the detection device has received the event message from the in-vehicle network; and a detection unit configured to compare the sequence number with the counter value, based on a result of monitoring, and perform provisional determination for detection of an unauthorized message, based on a result of the comparison. The detection unit performs conclusive determination for detection of the unauthorized message, based on an interval of messages that satisfy a predetermined condition regarding the sequence number, among messages to which the same identification information is assigned, and on a predetermined transmission cycle of the periodic message.

13 Claims, 18 Drawing Sheets

(56) References Cited

U.S. PATENT DOCUMENTS

| | | | |
|---|---|---|---|
| 2011/0231564 A1* | 9/2011 | Korsunsky | H04L 63/1483 |
| | | | 709/231 |
| 2015/0358351 A1 | 12/2015 | Otsuka et al. | |
| 2017/0286675 A1* | 10/2017 | Shin | H04L 63/1416 |
| 2019/0081960 A1* | 3/2019 | Kupfer | H04L 63/1416 |
| 2019/0081966 A1* | 3/2019 | Ploucha | H04L 63/1425 |
| 2019/0191020 A1* | 6/2019 | Hamada | H04L 63/1466 |
| 2019/0289022 A1* | 9/2019 | Thubert | H04L 47/32 |
| 2020/0014758 A1 | 1/2020 | Kamiguchi et al. | |
| 2020/0382528 A1 | 12/2020 | Kim et al. | |
| 2022/0094684 A1 | 3/2022 | Komedani | |
| 2022/0407868 A1* | 12/2022 | Tsukamoto | B60R 16/023 |

FOREIGN PATENT DOCUMENTS

| | | |
|---|---|---|
| JP | 2018-160851 A | 10/2018 |
| JP | 2019-126007 A | 7/2019 |
| WO | 2015/170451 A1 | 11/2015 |
| WO | 2020/246145 A1 | 12/2020 |

* cited by examiner

DETECTION DEVICE, DETECTION METHOD, AND DETECTION PROGRAM

CROSS-REFERENCE TO RELATED APPLICATIONS

The present application is based on PCT/JP2021/032961, filed on Sep. 8, 2021, which claims priority on Japanese Patent Application No. 2020-216834, filed on Dec. 25, 2020, the entire contents of each are incorporated herein by reference.

TECHNICAL FIELD

The present disclosure relates to a detection device, a detection method, and a detection program.

BACKGROUND ART

PATENT LITERATURE 1 (Japanese Laid-Open Patent Publication No. 2014-146868) discloses a network device as follows. That is, this network device includes a communication unit that receives data, a time management unit that manages reception time at which data is received, and a control unit that processes received data. The network device periodically receives and processes data. The control unit records the reception time in the time management unit for each of identifiers included in pieces of data received by the communication unit. In a case where first data, which has the same identifier as reference data and whose reception interval is shorter than a predetermined period, has been received, and then if second data having the same identifier as the first data is received before the predetermined period elapses from when the reference data is received, the control unit performs a period abnormality detection process. If data having the same identifier as the first data is not received before the predetermined period elapses, the control unit performs a predetermined process for the first data.

CITATION LIST

Patent Literature

PATENT LITERATURE 1: Japanese Laid-Open Patent Publication No. 2014-146868

SUMMARY OF THE INVENTION

Solution to Problem

A detection device according to the present disclosure is configured to detect an unauthorized message in an in-vehicle network, and includes: a monitoring unit configured to monitor a periodic message that is periodically transmitted and an event message that is non-periodically transmitted, as messages in the in-vehicle network, each message having, assigned thereto, identification information of a transmission source and a sequence number a counter unit configured to change a counter value corresponding to the identification information, when the detection device has received the event message from the in-vehicle network and a detection unit configured to compare the sequence number with the counter value, based on a result of monitoring by the monitoring unit, and perform provisional determination for detection of an unauthorized message, based on a result of the comparison. The detection unit performs conclusive determination for detection of the unauthorized message, based on an interval of messages that satisfy a predetermined condition regarding the sequence number, among messages to which the same identification information is assigned, and on a predetermined transmission cycle of the periodic message.

A detection device according to the present disclosure is configured to detect an unauthorized message in an in-vehicle network, and includes: a monitoring unit configured to, in the in-vehicle network, monitor a periodic message that is periodically transmitted, and two or more event messages that are transmitted non-periodically and successively with an interval shorter than a transmission cycle of the periodic message, each message having, assigned thereto, identification information of a transmission source; and a detection unit configured to count the number of event messages to which the same identification information is assigned and which have been successively transmitted, based on a result of the monitoring by the monitoring unit, and perform determination for detection of the unauthorized message, based on a result of the count.

A detection method according to the present disclosure is used by a detection device that detects an unauthorized message in an in-vehicle network, and the method includes: monitoring a periodic message that is periodically transmitted and an event message that is non-periodically transmitted, as messages in the in-vehicle network, each message having, assigned thereto, identification information of a transmission source and a sequence number; changing a counter value corresponding to the identification information, when the detection device has received the event message from the in-vehicle network; comparing the sequence number with the counter value, based on a result of the monitoring, and performing provisional determination for detection of an unauthorized message, based on a result of the comparison; and performing conclusive determination for detection of the unauthorized message, based on an interval of messages that satisfy a predetermined condition regarding the sequence number, among monitored messages to which the same identification information is assigned, and on a predetermined transmission cycle of the periodic message.

A detection program according to the present disclosure is used by a detection device that detects an unauthorized message in an in-vehicle network, and the program causes a computer to function as: a monitoring unit configured to monitor a periodic message that is periodically transmitted and an event message that is non-periodically transmitted, as messages in the in-vehicle network, each message having, assigned thereto, identification information of a transmission source and a sequence number; a counter unit configured to change a counter value corresponding to the identification information, when the detection device has received the event message from the in-vehicle network; and a detection unit configured to compare the sequence number with the counter value, based on a result of monitoring by the monitoring unit, and perform provisional determination for detection of an unauthorized message, based on a result of the comparison. The detection unit performs conclusive determination for detection of the unauthorized message, based on an interval of messages that satisfy a predetermined condition regarding the sequence number, among messages to which the same identification information is assigned, and on a predetermined transmission cycle of the periodic message.

One mode of the present disclosure can be realized as a semiconductor integrated circuit that realizes a part or the entirety of the detection device, or as a system including the detection device. One mode of the present disclosure can be realized as a semiconductor integrated circuit that realizes a part the entirety of a system including the detection device.

DETAILED DESCRIPTION

Figure 1:
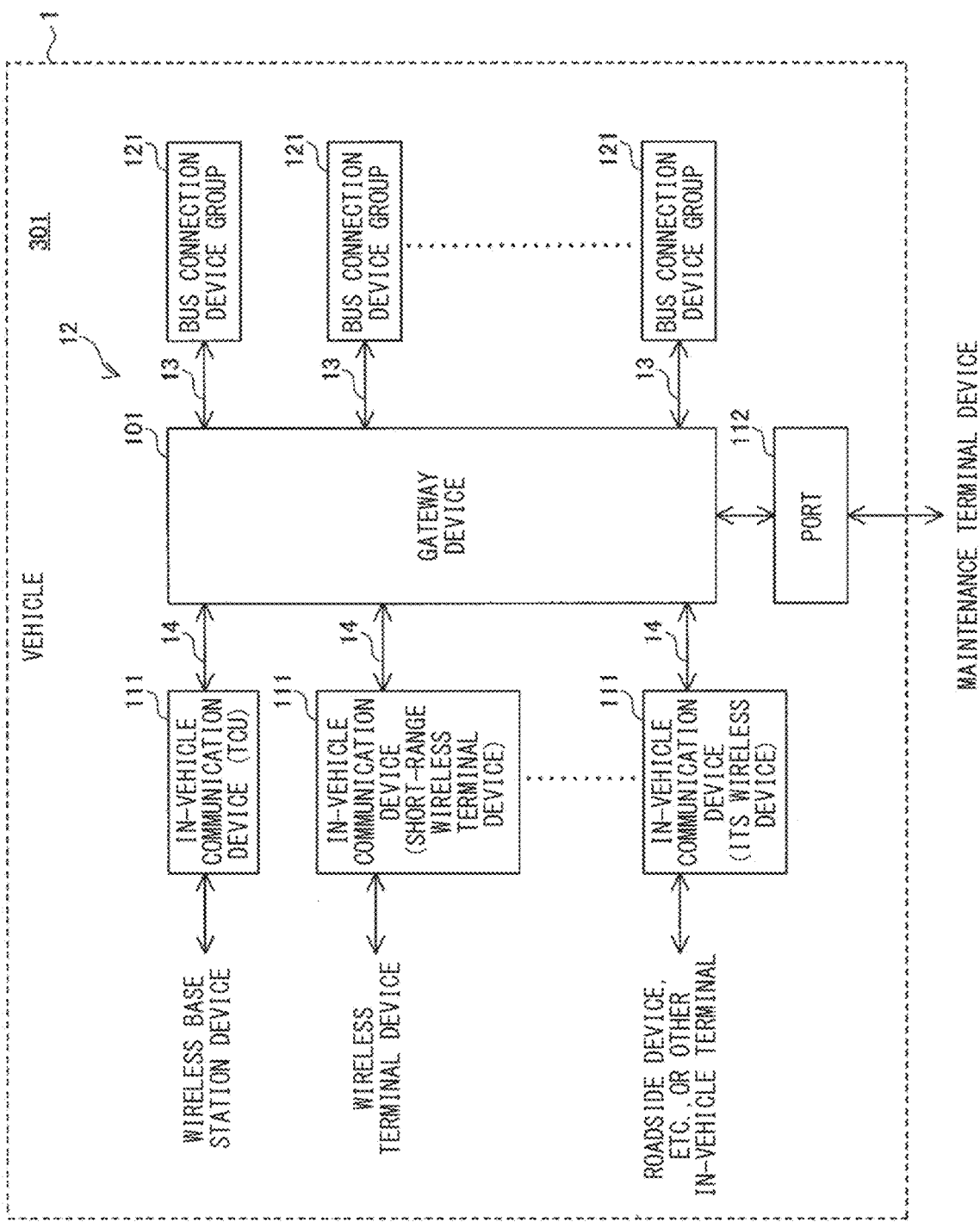
FIG. 1 shows a configuration of an in-vehicle communication system according to a first embodiment of the present disclosure.

To date, a technology for improving security in an in-vehicle network has been developed.

Problems to be Solved by the Present Disclosure

A technology capable of more accurately detecting an unauthorized message in an in-vehicle network is desired beyond the technology described in PATENT LITERATURE 1.

The present disclosure is made to solve the above problem, and an object of the present disclosure is to provide a detection device, a detection method, and a detection program capable of more accurately detecting an unauthorized message in an in-vehicle network.

Effects of the Present Disclosure

According to the present disclosure, it is possible to more accurately detect an unauthorized message in an in-vehicle network.

DESCRIPTION OF EMBODIMENT OF THE PRESENT DISCLOSURE

First, contents of embodiments of the present disclosure are listed and described.

(1) A detection device according to an embodiment of the present disclosure is configured to detect an unauthorized message in an in-vehicle network, and includes: a monitoring unit configured to monitor a periodic message that is periodically transmitted and an event message that is non-periodically transmitted, as messages in the in-vehicle network, each message having, assigned thereto, identification information of a transmission source and a sequence number; a counter unit configured to change a counter value corresponding to the identification information, when the detection device has received the event message from the in-vehicle network; and a detection unit configured to compare the sequence number with the counter value, based on a result of monitoring by the monitoring unit, and perform provisional determination for detection of an unauthorized message, based on a result of the comparison. The detection unit performs conclusive determination for detection of the unauthorized message, based on an interval of messages that satisfy a predetermined condition regarding the sequence number, among messages to which the same identification information is assigned, and on a predetermined transmission cycle of the periodic message.

In the above configuration, the detection unit performs the conclusive determination in which the detection result regarding an unauthorized message in the provisional determination can be corrected, based on the interval of messages that satisfy the predetermined condition regarding the sequence number, and on the predetermined transmission cycle of the periodic message. Therefore, even in a case where an unauthorized message the sequence number of which is adjusted to the counter value is transmitted, the unauthorized message is determined to be an authorized message, and an authorized message is erroneously detected to be an unauthorized message, it is possible to verify validity of the detection result and correct the detection result, Therefore, an unauthorized message in the in-vehicle network can be more accurately detected.

(2) A first sequence number may be assigned to each message as the sequence number of the message, and the first sequence number is changed each time the periodic message or the event message is transmitted. The counter unit may change the counter value when the detection device has received each of the periodic message and the event message.

In the above configuration, all the messages can be managed by the sequence numbers without the necessity of discriminating between the periodic message and the event message, whereby the configuration of the detection device can be simplified.

(3) The interval may be a reception interval between a first message and a second message that has the first sequence number just prior to the first sequence number of the first message.

In the above configuration, the timing at which an unauthorized message is transmitted can be roughly specified through a simple process.

(4) A first sequence number may be assigned to each message as the sequence number of the message, and the first sequence number is changed each time the periodic message or the event message is transmitted. The detection unit may detect missing of periodic messages, based on the result of the monitoring, correct the counter value, based on the number of missing periodic messages, compare the first sequence number with the corrected counter value, and detect the unauthorized message, based on a result of the comparison.

In the above configuration, even when a periodic message which is an authorized message is missing for some reason, detection of an unauthorized message can be performed taking into consideration such missing, thereby inhibiting erroneous detection from occurring.

(5) A second sequence number may be assigned to each message as the sequence number of the message, and the second sequence number is not changed when the periodic message is transmitted, and is changed each time the event message is transmitted. The counter unit may change the counter value when the detection device has received the event message out of the periodic message and the event message.

In the above configuration, it is possible to discriminate between a periodic message and an event message, and detect an unauthorized message from abnormality of the event message.

(6) The interval may be a reception interval between a third message and a fourth message that has a second sequence number equal to the second sequence number of the third message.

In the above configuration, the timing at which an unauthorized message is transmitted can be roughly specified through a simple process.

(7) The detection unit may transition to a transient state after correcting, in the conclusive determination, a detection result regarding an unauthorized message in the provisional determination. In the transient state, the detection unit may detect an unauthorized message, based on a reception interval of messages that have been temporally successively received, among the messages to which the same identification information is assigned, and on the sequence numbers of the received messages.

In the above configuration, detection of an unauthorized message can be continued even after the result of detection of an unauthorized message has been corrected by using the counter value.

(8) A detection device according to the embodiment of the present disclosure is configured to detect an unauthorized message in an in-vehicle network, and includes: a monitoring unit configured to, in the in-vehicle network, monitor a periodic message, that is periodically transmitted, and two or more event messages that are transmitted non-periodically and successively with an interval shorter than a transmission cycle of the periodic message, each message having, assigned thereto, identification information of a transmission source; and a detection unit configured to count the number of event messages to which the same identification information is assigned and which have been successively transmitted, based on a result of the monitoring by the monitoring unit, and detect an unauthorized message based on a result of the count.

In the above configuration, the detection unit counts the number of the successively transmitted event messages, and detects an unauthorized message, based on the result of the count, whereby an unauthorized message masquerading as an event message can be easily detected. Therefore, an unauthorized message in the in-vehicle network can be more accurately detected.

(9) A detection method according to the embodiment of the present disclosure is used by a detection device that detects an unauthorized message in an in-vehicle network, and the method includes: monitoring a periodic message that is periodically transmitted and an event message that is non-periodically transmitted, as messages in the in-vehicle network, each message having, assigned thereto, identification information of a transmission source and a sequence number; changing a counter value corresponding to the identification information, when the detection device has received the event message from the in-vehicle network; comparing the sequence number with the counter value, based on a result of the monitoring, and performing provisional determination for detection of an unauthorized message, based on a result of the comparison; and performing conclusive determination for detection of the unauthorized message, based on an interval of messages that satisfy a predetermined condition regarding the sequence number, among monitored messages to which the same identification information is assigned, and on a predetermined transmission cycle of the periodic message.

In the above method, the conclusive determination, in which the detection result regarding an unauthorized message in the provisional determination can be corrected, is performed based on the interval of messages that satisfy the predetermined condition regarding the sequence number, and on the predetermined transmission cycle of the periodic message. Therefore, even in a case where an unauthorized message the sequence number of which is adjusted to the counter value is transmitted, the unauthorized message is determined to be an authorized message, and an authorized message is erroneously detected to be an unauthorized message, it is possible to verify validity of the detection result and correct the detection result according to need. Therefore, an unauthorized message in the in-vehicle network can be more accurately detected.

(10) A detection program according to the embodiment of the present disclosure is used by a detection device that detects an unauthorized message in an in-vehicle network, and the program causes a computer to function as: a monitoring unit configured to monitor a periodic message that is periodically transmitted and an event message that is non-periodically transmitted, as messages in the in-vehicle network, each message having, assigned thereto, identification information of a transmission source and a sequence number; a counter unit configured to change a counter value corresponding to the identification information, when the detection device has received the event message from the in-vehicle network; and a detection unit configured to compare the sequence number with the counter value, based on a result of monitoring by the monitoring unit, and perform provisional determination for detection of an unauthorized message, based on a result of the comparison. The detection unit performs conclusive determination for detection of the unauthorized message, based on an interval of messages that satisfy a predetermined condition regarding the sequence number, among messages to which the same identification information is assigned, and on a predetermined transmission cycle of the periodic message.

In the above configuration, the detection unit performs the conclusive determination in which the detection result regarding an unauthorized message in the provisional determination can be corrected, based on the interval of messages that satisfy the predetermined condition regarding the sequence number, and on the predetermined transmission cycle of the periodic message. Therefore, even in a case where an unauthorized message the sequence number of which is adjusted to the counter value is transmitted, the unauthorized message is determined to be an authorized message, and an authorized message is erroneously detected to be an unauthorized message, it is possible to verify validity of the detection result and correct the detection result according to need. Therefore, an unauthorized message in the in-vehicle network can be more accurately detected.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

FIRST EMBODIMENT

[Configuration and Basic Operation]

FIG. 1 shows a configuration of an in-vehicle communication system according to a first embodiment of the present disclosure.

With reference to FIG. 1, an in-vehicle communication system 301 mounted in a vehicle 1 includes a gateway device 101, a plurality of in-vehicle communication devices 111, and a plurality of bus connection device groups 121. The gateway device 101 is an example of a detection device. The gateway device 101 is connected to each bus connection device group 121 via a bus 13, and is connected to each in-vehicle communication device 111 via a bus 14. The gateway device 101, the plurality of in-vehicle communication devices 111, and the plurality of bus connection device groups 121, which are connected via the buses 13, 14, constitute an in-vehicle network 12.

Figure 2:
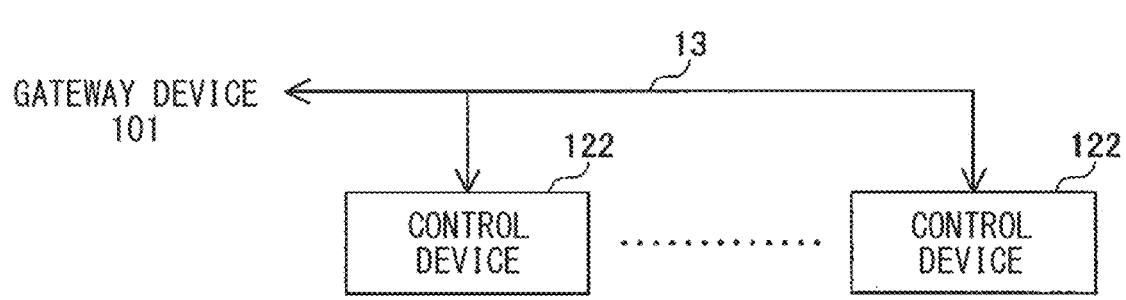
FIG. 2 shows a configuration of a bus connection device group according to the first embodiment of the present disclosure.

FIG. 2 shows a configuration of a bus connection device group according to the first embodiment of the present disclosure.

With reference to FIG. 2, the bus connection device group 121 includes a plurality of control devices 122. The bus connection device group 121 may not necessarily include a plurality of control devices 122, and may include one control device 122.

The in-vehicle communication system 301 includes a plurality of in-vehicle devices that are devices inside the vehicle 1. Specifically, the in-vehicle communication system 301 includes a plurality of in-vehicle communication devices 111 and a plurality of control devices 122, which are examples of the in-vehicle devices. As long as the in-vehicle communication system 301 includes a plurality of in-vehicle devices, the in-vehicle communication system 301 may be configured to include a plurality of in-vehicle communication devices 111 and not to include any control device 122, may be configured not to include any in-vehicle communication device 111 and to include a plurality of control devices 122, or may be configured to include one in-vehicle communication device 111 and one control device 122.

In the in-vehicle communication system 301, each in-vehicle communication device 111 communicates with a device outside the vehicle 1, for example. Specifically, the in-vehicle communication device 111 is a TCU (Telematics Communication Unit), a short-range wireless terminal device, or an ITS (Intelligent Transport Systems) wireless device, for example.

The TCU can wirelessly communicate with a wireless base station device in accordance with a communication standard such as LTE (Long Term Evolution) or 5G, and can communicate with the gateway device 101, for example. The TCU relays information to be used in services such as navigation, vehicle burglar prevention, remote maintenance, and FOTA (Firmware Over The Air), for example.

For example, the short-range wireless terminal device can wirelessly communicate with a wireless terminal device such as a smartphone held by a person in the vehicle 1, i.e., an occupant, in accordance with a communication standard such as (registered trademark) or Bluetooth (registered trademark), and can communicate with the gateway device 101. The short-range wireless terminal device relays information to be used in a service such as entertainment, for example.

Moreover, for example, the short-range wireless terminal device can wirelessly communicate with a wireless terminal device such as a smart key held by the occupant and with a wireless terminal device provided at a tire, in accordance with a predetermined communication standard, by using a radio wave in an LI' (Low Frequency) band or a UHF (Ultra High Frequency) band, and can communicate with the gateway device 101. The short-range wireless terminal device relays information to be used in services such as smart entry and TPMS (Tire Pressure Monitoring System), for example.

The ITS wireless device can perform roadside-to-vehicle communication with a roadside device, such as an optical beacon, a radio wave beacon, or an ITS spot, provided in the vicinity of a road, can perform vehicle-to-vehicle communication with an in-vehicle terminal mounted in another vehicle, and can communicate with the gateway device 101, for example. The ITS wireless device relays information to be used in services such as congestion alleviation, safe driving support, and route guidance, for example.

The gateway device 101 can transmit/receive data for update or the like of firmware, and data or the like accumulated by the gateway device 101 to/from a maintenance terminal device outside the vehicle 1 via a port 112, for example.

The gateway device 101 is connected to the in-vehicle devices via the buses 13, 14, for example. Specifically, each bus 13, 14 is a bus according to, for example, a standard of CAN (Controller Area Network)®, FlexRay®, MOST (Media Oriented Systems Transport)®, Ethernet®, IAN (Local Interconnect Network), or the like.

In this example, each in-vehicle communication device 111 is connected to the gateway device 101 via a corresponding bus 14 according to the Ethernet standard. Each control device 122 in each bus connection device group 121 is connected to the gateway device 101 via a corresponding bus 13 according to the CAN standard.

The buses 13 are provided for the respective types of systems, for example. Specifically, the buses 13 are implemented as a drive-related bus, a chassis/safety-related bus, a body/electrical-equipment-related bus, and an AV/information-related bus, for example.

The drive-related bus has, connected thereto, an engine control device, an AT (Automatic Transmission) control device, and an HEV (Hybrid Electric Vehicle) control device, which are examples of the control device 122. The engine control device, the AT control device, and the HEV control device control an engine, AT, and switching between the engine and a motor, respectively.

The chassis/safety-related bus has, connected thereto, a brake control device, a chassis control device, and a steering control device, which are examples of the control device 122. The brake control device, the chassis control device, and the steering control device control a brake, a chassis, and steering, respectively.

The body/electrical-equipment-related bus has, connected thereto, an instrument indication control device, an air conditioner control device, a burglar prevention control device, an air bag control device, and a smart entry control device, which are examples of the control device 122. The instrument indication control device, the air conditioner control device, the burglar prevention control device, the air bag control device, and the smart entry control device control instruments, an air conditioner, a burglar prevention mechanism, an air bag mechanism, and smart entry, respectively.

The AV/information-related bus has, connected thereto, a navigation control device, an audio control device, an ETC (Electronic Toll Collection System) (registered trademark) control device, and a telephone control device, which are examples of the control device 122. The navigation control device, the audio control device, the ETC control device, and the telephone control device control a navigation device, an audio device, an ETC device, and a mobile phone, respectively.

The bus 13 may not necessarily have the control devices 122 connected thereto, and may have connected thereto a device other than the control devices 122.

The gateway device 101 is a central gateway (CCM), for example, and can communicate with the in-vehicle devices.

The gateway device 101 performs a relay process of relaying information transmitted/received between control devices 122 connected to different buses 13 in the vehicle 1, information transmitted/received between in-vehicle communication devices 111, and information transmitted/received between a control device 122 and an in-vehicle communication device 111, for example.

More specifically, in the vehicle 1, as messages in the in-vehicle communication system 301, a periodic message and an event message are transmitted from a certain in-vehicle device to another in-vehicle device, according to a predetermined rule, for example. The periodic message is periodically transmitted from a certain in-vehicle device to another in-vehicle device. The event message is non-periodically transmitted from a certain in-vehicle device to another in-vehicle device.

In this example, a message that is transmitted between two in-vehicle devices, i.e., from a certain control device 122 to another control device 122, is described. However, the same applies to a message that is transmitted between a control device 122 and an in-vehicle communication device 111, and a message that is transmitted between in-vehicle communication devices 111.

Figure 3:
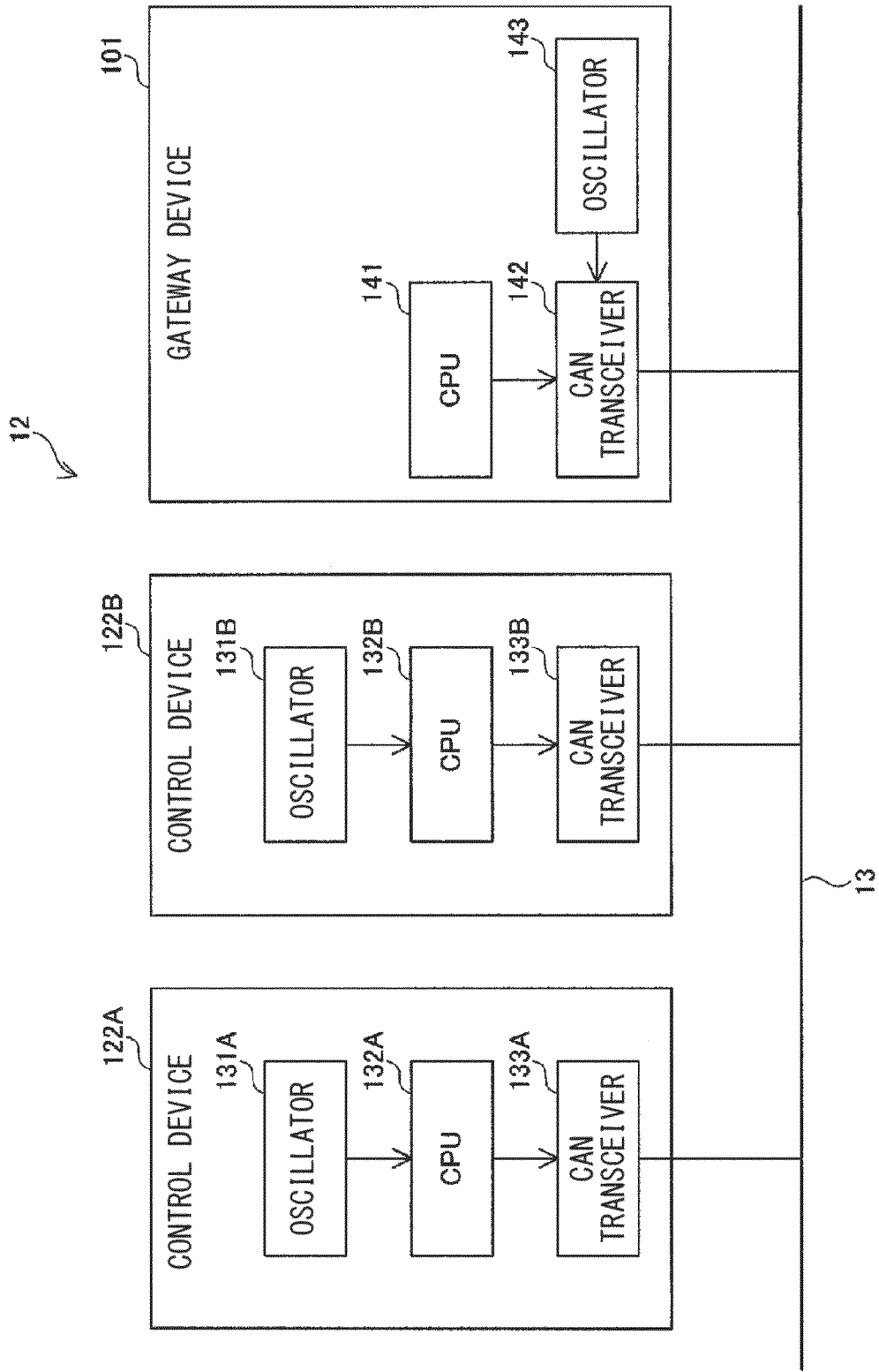
FIG. 3 shows an example of hardware configurations of control devices and a gateway device in the in-vehicle communication system according to the first embodiment of the present disclosure.

FIG. 3 shows an example of hardware configurations of control devices and a gateway device in the in-vehicle communication system according to the first embodiment of the present disclosure.

With reference to FIG. 3, control devices 122A, 122B which are examples of the control device 122 are connected to the gateway device 101 via a bus 13. The control device 122A includes an oscillator 131A, a processor 132A such as a CPU (Central Processing Unit) or a DSP (Digital Signal Processor), and a CAN transceiver 133A. The control device 122B has the same configuration as the control device 122A, and includes an oscillator 131B, a processor 132B, and a CAN transceiver 133B.

The gateway device 101 includes a processor 141 such as a CPU or a DSP, a CAN transceiver 142, and an oscillator 143.

The control device 122A transmits a periodic message in a predetermined transmission cycle. More specifically, the processor 132A in the control device 122A transmits the periodic message via the CAN transceiver 133A, according to the timing of a clock generated based on an oscillation signal from the oscillator 131A. Moreover, the control device 122A non-periodically transmits an event message. More specifically, the processor 132A in the control device 122A non-periodically transmits the event message via the CAN transceiver 133A.

The control device 122A assigns a message ID (Identifier) as an example of identification information to the periodic message and the event message when transmitting the messages. The message ID indicates the transmission source of the periodic message and the event message. The message ID may further indicate a transmission priority, a message transmission type indicating whether the message is a periodic message or an event message, a message content, etc.

Moreover, a sequence number (first sequence number) is assigned to each of the periodic message and the event message, and the sequence number is changed each time the message is transmitted. More specifically, the control device 122A includes, in each of the periodic message and the event message, a sequence number that is incremented by 1 each time the message is transmitted. That is, the control device 122A assigns serial numbers to messages to be transmitted, regardless of the message type, i.e., regardless of whether each message is a periodic message or an event message.

When a certain control device 122 transmits a periodic message and an event message to a plurality of control devices 122, the control device 122 sets a sequence number for each message ID. Meanwhile, when a certain control device 122 selectively uses a plurality of message IDs according to the contents of the messages, the control device 122 sets a sequence number for each message ID.

[Configuration of Gateway Device]

Figure 4:
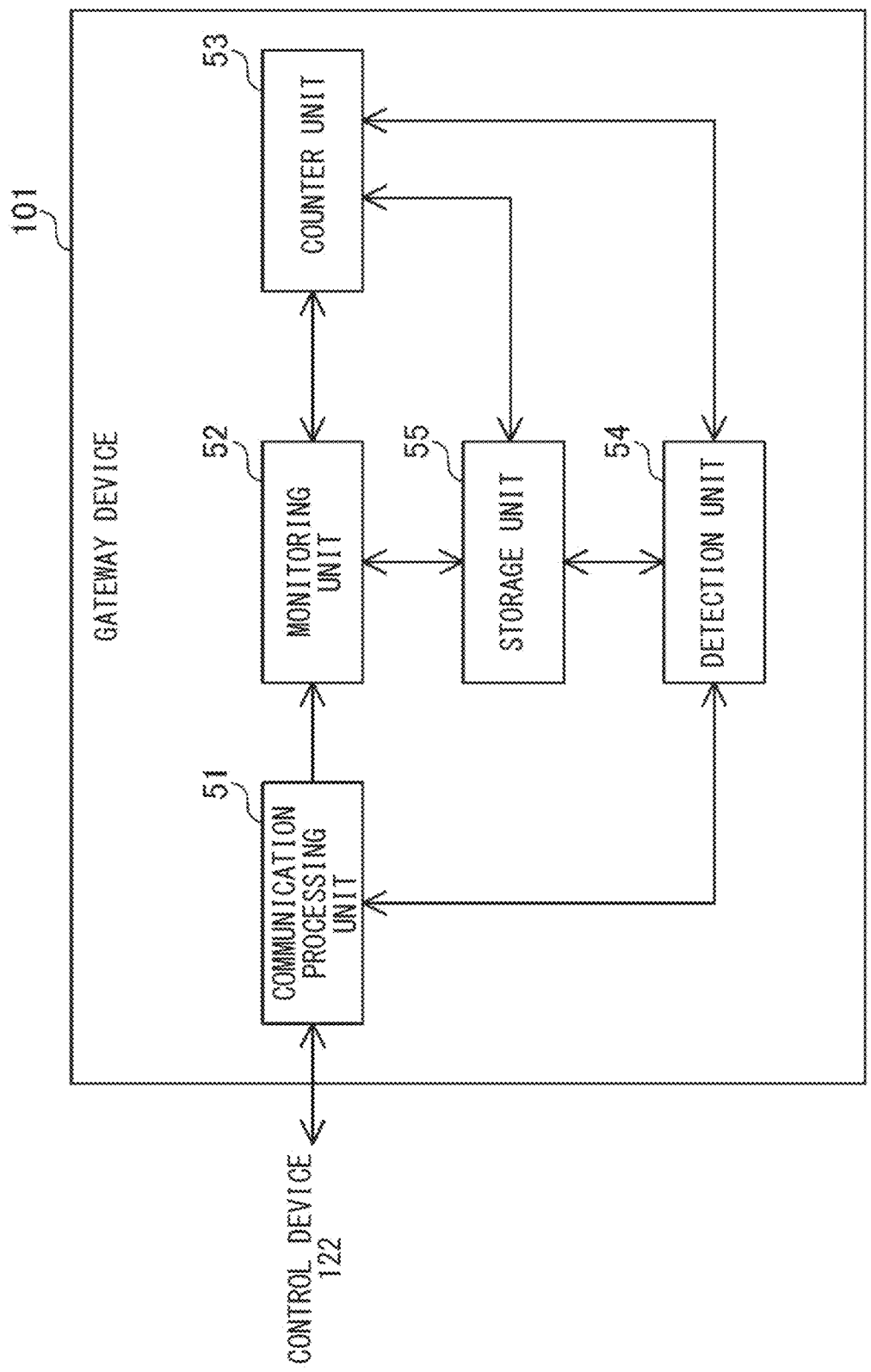
FIG. 4 shows a configuration of a gateway device in the in-vehicle communication system according to the first embodiment of the present disclosure.

FIG. 4 shows a configuration of the gateway device in the in vehicle communication system according to the first embodiment of the present disclosure.

With reference to FIG. 4, the gateway device 101 includes a communication processing unit 51, a monitoring unit 52, a counter unit 53, a detection unit 54, and a storage unit 55. The processor 141 shown in FIG. 3 implements a part or the entirety of the monitoring unit 52, the counter unit 53, and the detection unit 54. The CAN transceiver 142 implements a part or the entirety of the communication processing unit 51. The storage unit 55 is a flash memory, for example.

The gateway device 101 functions as a detection device, and performs a detection process of detecting an unauthorized message in the in-vehicle network 12.

[Communication Processing Unit]

The communication processing unit 51 receives a message on the bus 13, 14 in the in-vehicle network 12. Upon receiving the message, the communication processing unit 51 assigns, to the message, a time stamp indicating the reception time of the message, and outputs a message reception notification to the monitoring unit 52 and the detection unit 54.

[Monitoring Unit]

The monitoring unit 52 monitors messages in the in-vehicle network 12, i.e., a periodic message that is periodically transmitted and an event message that is non-periodically transmitted. A message ID as transmission source identification information and a sequence number are assigned to each message.

Referring back to FIG. 3, the monitoring unit 52 monitors the messages in the in-vehicle network 12, and acquires the reception time of a periodic message and the reception time of an event message.

For example, upon receiving the reception notification from the communication processing unit 51, the monitoring unit 52 confirms the message ID included in the message received by the communication processing unit 51, and the message ID of the periodic message and the message ID of the event message, which are stored in the storage unit 55 in advance.

When the message ID included in the message received by the communication processing unit 51 matches the message ID stored in the storage unit 55, the monitoring unit 52 acquires the reception time of the message by referring to the time stamp assigned to the message.

Upon acquiring the reception time, the monitoring unit 52 outputs, to the detection unit 54, reception information indicating the acquired reception time in association with the sequence number.

[Counter Unit]

When the gateway device 101 has received at least an event message from the in-vehicle network 12, the counter unit 53 changes a counter value corresponding to identification information of the message. A counter value is set for each message ID. In the present embodiment, the counter unit 53 changes the counter value when the gateway device 101 receives each of a periodic message and an event message.

More specifically When the received message has been determined as an authorized message by the detection unit 54 as described below, the counter unit 53 increments the counter value by 1. The counter unit 53 stores the incremented counter value in the storage unit 55.

When a plurality of control devices 122 respectively transmit messages, the counter unit 53 sets different counter values for the respective message IDs. When a certain control device 122 selectively uses a plurality of message IDs according to the contents of messages, the counter unit 53 sets a counter value for each message H).

[Detection Unit]

The detection unit 54 compares the sequence number with the counter value, based on a result of monitoring by the monitoring unit 52, and performs provisional determination for detection of an unauthorized message, based on a result of the comparison.

More specifically, upon receiving a message reception notification from the communication processing unit 51, the detection unit 54 acquires the sequence number and the counter value of the corresponding message from the storage unit 55. The detection unit 54 compares the sequence number with the counter value. The detection unit 54 determines that the received message is an authorized message when the sequence number is the same as the counter value, and determines that the received message is an unauthorized message when the sequence number is different from the counter value.

Figure 5:
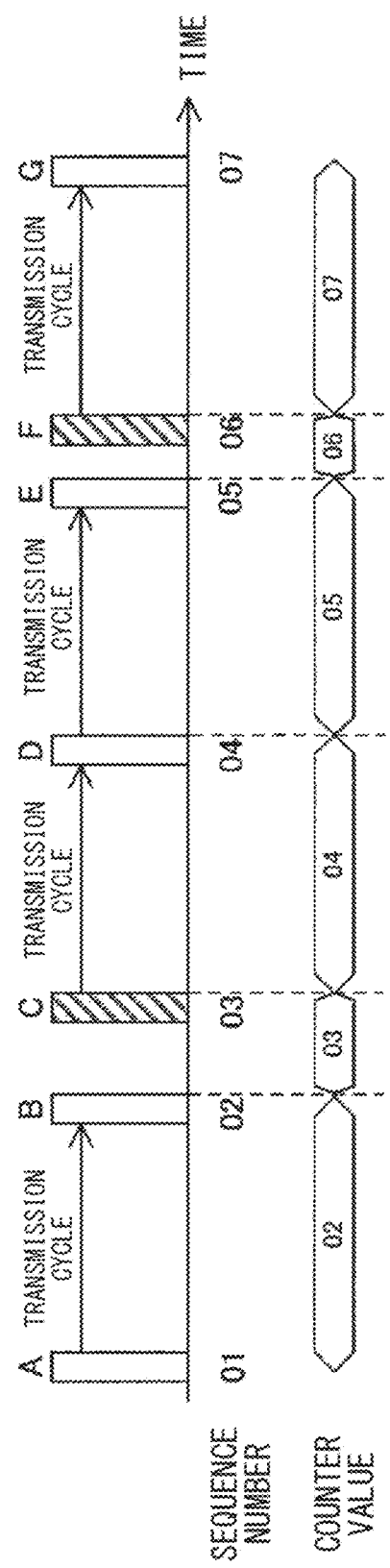
FIG. 5 shows an example of a case where a received message is determined to be an authorized message in the gateway device according to the first embodiment of the present disclosure.

FIG. 5 shows an example of a case where a received message is determined to be an authorized message in the gateway device according to the first embodiment of the present disclosure.

With reference to FIG. 5, sequence number "01" is assigned to a message A that the control device 122A firstly transmits. An initial counter value of the counter unit 53 in the gateway device 101 is set to "01".

When the gateway device 101 has received the periodic message A with the sequence number "01" from the control device 122A via, the bus 13, the counter unit 53 in the gateway device 101 increments the counter value by 1 to set it to "02".

Next, when the gateway device 101 has received a periodic message B with sequence number "02", the detection unit 54 determines that the periodic message B is an authorized message because both the sequence number and the counter value are "02", i.e., there is a match. Thereafter, the counter unit 53 increments the counter value by 1 to set it to "03".

Next, when the gateway device 101 has received an event message C with sequence number "03", the detection unit 54 determines that the event message C is an authorized message because both the sequence number and the counter value are "03", i.e., there is a match. Thereafter, the counter unit 53 sets the counter value to "04".

As for messages D to G to be received thereafter, the detection unit 54 determines whether or not each message is an authorized message. In the example shown in FIG. 5, the detection unit 54 determines that the messages D to G are authorized messages.

Figure 6:
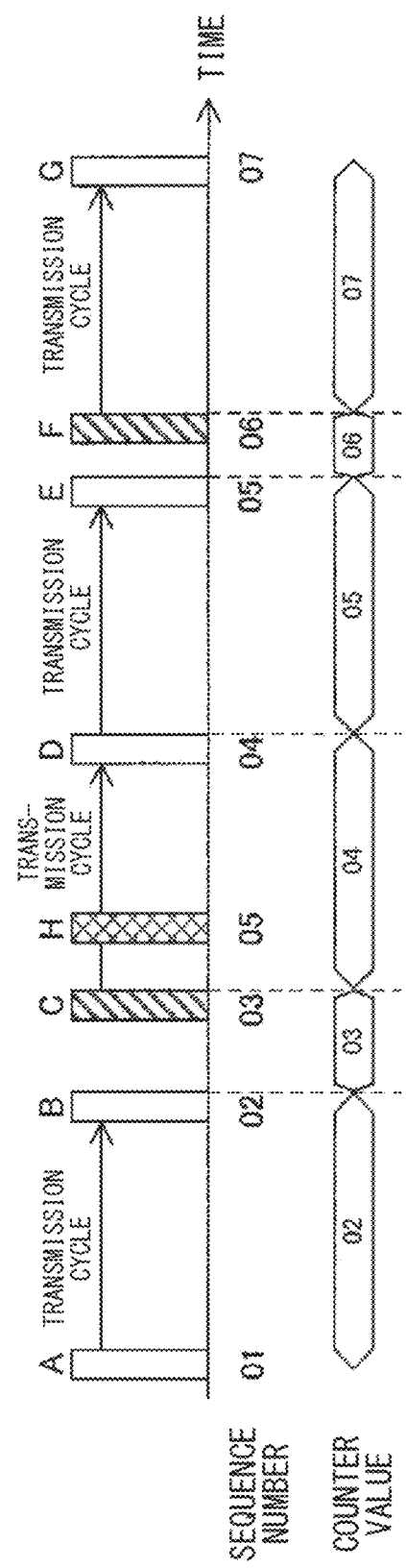
FIG. 6 shows an example of a case where a received message is determined to be an unauthorized message in the gateway device according to the first embodiment of the present disclosure.

FIG. 6 shows an example of a case where a received message is determined to be an unauthorized message in the gateway device according to the first embodiment of the present disclosure. FIG. 6 is different from FIG. 5 in that the gateway device 101 receives an unauthorized message H after reception of the event message C.

With reference to FIG. 6, after the gateway device 101 has received the messages A to C, the counter unit 53 sets the counter value to "04". Thereafter, when the gateway device 101 has received a message H with sequence number "05", the detection unit 54 determines that the message H is an unauthorized message because the sequence number and the counter value do not match.

(Correction of Detection Result)

Upon detecting an unauthorized message, the detection unit 54 determines whether or not a detection result is valid. More specifically, upon detecting an unauthorized message in provisional determination, the detection unit 54 performs conclusive determination for the detection of the unauthorized message, based on an interval of messages that satisfy a predetermined condition regarding the sequence number, among messages which are monitored by the monitoring unit 52 and to which the same identification information is assigned, and on the predetermined transmission cycle of the periodic message. Then, the detection unit 54 performs a correction process of correcting the detection result regarding an unauthorized message in the provisional determination. In the present embodiment, the interval of messages is a reception interval between a first message and a second message having a sequence number just prior to that of the first message.

(Case 1 where No Correction is Performed)

First, a case where the detection unit 54 does not correct the detection result will be described with reference to the example shown in FIG. 6. In the example shown in FIG. 6, the first message is the message H that has once been determined to be an unauthorized message, and the sequence number thereof is "05". The second message is a message to which sequence number "04" that is one count prior to the message H is assigned, but the gateway device 101 has not received the message with the sequence number "04" before reception of the message H. Therefore, in the example shown in FIG. 6, the detection unit 54 does not correct the detection result because the message corresponding to the second message is absent, and determines that the message H is an unauthorized message.

When the gateway device 101 has received the unauthorized message H, the counter unit 53 does not change the counter value and maintains "04". The detection unit 54 determines that the messages D to G received thereafter are authorized messages.

(Case 2 where No Correction is Performed)

It is assumed that the sequence number of the message H is "02" in the example shown in FIG. 6. In this case, since the sequence number of the message H does not match the counter value of the counter unit 53, the message 1I is once determined to be an unauthorized message. Since the unauthorized message has been detected, the detection unit 54 determines validity of the detection result, as described above. In this case, the message having the sequence number "01" that is one coin t prior to the message H as the first message is the message A. However, since the gateway device 101 has received the messages B and C between the message A and the message H, the message A is not a message that temporally precedes the message H and therefore, does not correspond to the second message. Therefore, even in this case, the detection unit 54 does not correct e detection result and determines that the message H is an unauthorized message.

(Case where Correction is Performed)

Next, a case where the detection unit 54 corrects a detection result will be described. In the example shown in FIG. 6, the detection unit 54 determines that the message H is an unauthorized message because the sequence number of the message H is different from the counter value of the counter unit 53. However, if the sequence number of the message H is the same as the counter value of the counter unit 53, the message H being an unauthorized message will be determined to be an authorized message and the message D being an authorized message will be determined as an unauthorized message. Even when a message that should originally be an authorized message is determined to be an unauthorized message, the gateway device 101 according to the present embodiment can reduce such erroneous detection by correcting the detection result.

Figure 7:
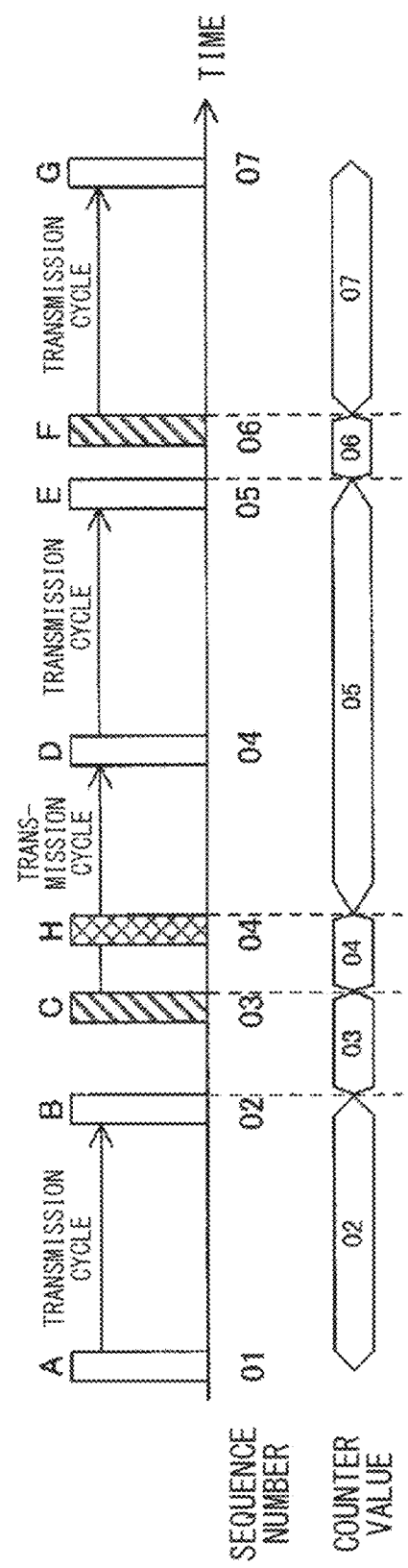
FIG. 7 shows an example of a case where the gateway device corrects a detection result, according to the first embodiment of the present disclosure.

FIG. 7 shows an example of a case where the gateway device corrects a detection result, according to the first embodiment of the present disclosure.

With reference to FIG. 7, first, the gateway device 101 receives messages A to C in order. The detection unit 54 determines that each of the messages A to C is an authorized message because the sequence number matches the counter value. In this state, the counter value of the counter unit 53 is set to "04".

Next, the gateway device 101 receives an unauthorized message H. Since sequence number "04" is assigned to the unauthorized message H, the detection unit 54 determines that the unauthorized message H is an authorized message. The counter unit 53 increments the counter value to "05".

Next, the gateway device 101 receives a message D. The message D is a message transmitted next to the message C from the control device 122A, and therefore has sequence number "04". However, since the counter value of the counter unit 53 is "05" and does not match the sequence number, the detection unit 54 provisionally determines that the message D being originally an authorized message is an unauthorized message.

Next, the detection unit 54 determines validity of the detection result indicating that the message D is an unauthorized message. As described above, the detection unit 54 determines whether or not to correct the detection result, based on an interval of messages that satisfy the predetermined condition regarding the sequence number, among messages to which the same identification information is assigned, and on the predetermined transmission cycle of the periodic message.

The interval of messages satisfying the predetermined condition is not an interval of temporally successive messages that are actually received by the gateway device 101, but an interval between a certain message and a message having a sequence number that is assigned as a number just prior to the sequence number of the certain message, i.e., an interval between a certain message and a message that should originally be received just prior to the certain message.

Specifically, the message that has actually been received temporally preceding the message D determined to be an unauthorized message is the message H. However, in the present embodiment, the control device 122A assigns, in a sequential order, sequence numbers to messages to be transmitted, regardless of the message type, i.e., regardless of whether each message is a periodic message or an event message. Therefore, the message that should originally be received prior to the message D is not the message H having the same sequence number "04" as the message D, but the message C having the sequence number "03" that is just prior to the message D. Therefore, in the example shown in FIG. 7, the detection unit 54 determines whether or not to correct the detection result, based on the reception interval between the message D as the first message and the message C as the second message, and on the transmission cycle of the periodic message.

More specifically, the detection unit 54 acquires, from the storage unit 55, the reception times of the message D and the message C, and the predetermined transmission cycle of the periodic message. The detection unit 54 calculates a reception interval from a difference between the acquired reception times of the messages D and C. The detection unit 54 compares the calculated reception interval with the predetermined transmission cycle of the periodic message, and determines whether or not the reception interval is less than the transmission cycle, or whether or not the reception interval is less than a value obtained by adding a predetermined margin to the transmission cycle. Hereinafter, this criterion, i.e., the transmission cycle or the value obtained by adding the predetermined margin to the transmission cycle, is referred to as an allowable value, in the present embodiment, for example, the predetermined transmission cycle of the periodic message is 20 ms, and the margin is +6 ms.

More specifically, in the present embodiment, the reception interval between the message D and the message C is 20 ms, which is less than the allowable value. In this case, the message D is highly likely to be an authorized periodic message transmitted after the predetermined transmission cycle of 20 ms from transmission of the message C being an authorized message. Therefore, when the reception interval is less than the allowable value, the detection unit 54 corrects the detection result indicating that the message D is an unauthorized message, and determines that the message D is an authorized message. The transmission cycle and the margin are not limited to those described above, and can be set as appropriate. The margin may not necessarily be provided.

After correcting the detection result, the detection unit 54 determines that an unauthorized message has been received prior to the message D, and outputs, to the communication processing unit 51, a detection result indicating that the unauthorized message has been detected.

Meanwhile, if the reception interval between the message D and the message C is equal to or greater than the allowable value, the message D is highly likely to be an unauthorized message. Therefore, the detection unit 54 maintains the detection result, determines that the message D is an unauthorized message, and outputs, to the communication processing unit 51, a detection result indicating that the unauthorized message has been detected.

Upon receiving the detection result from the detection unit 54, the communication processing unit 51 transmits warning information indicating that the unauthorized message is being transmitted through the bus 13, to a higher-order device located inside or outside the vehicle 1.

Operation Flow

Each of the devices in the in-vehicle communication system according to the embodiment of the present disclosure includes a computer including a memory, An arithmetic processing unit such as a CPU in the computer reads out, from the memory, a program including a part or all of steps in the flowcharts and sequences shown below, and executes the program. Programs of the plurality of devices can each be installed from outside. The programs of the plurality of devices are each distributed in a state of being stored in a storage medium.

Figure 8:
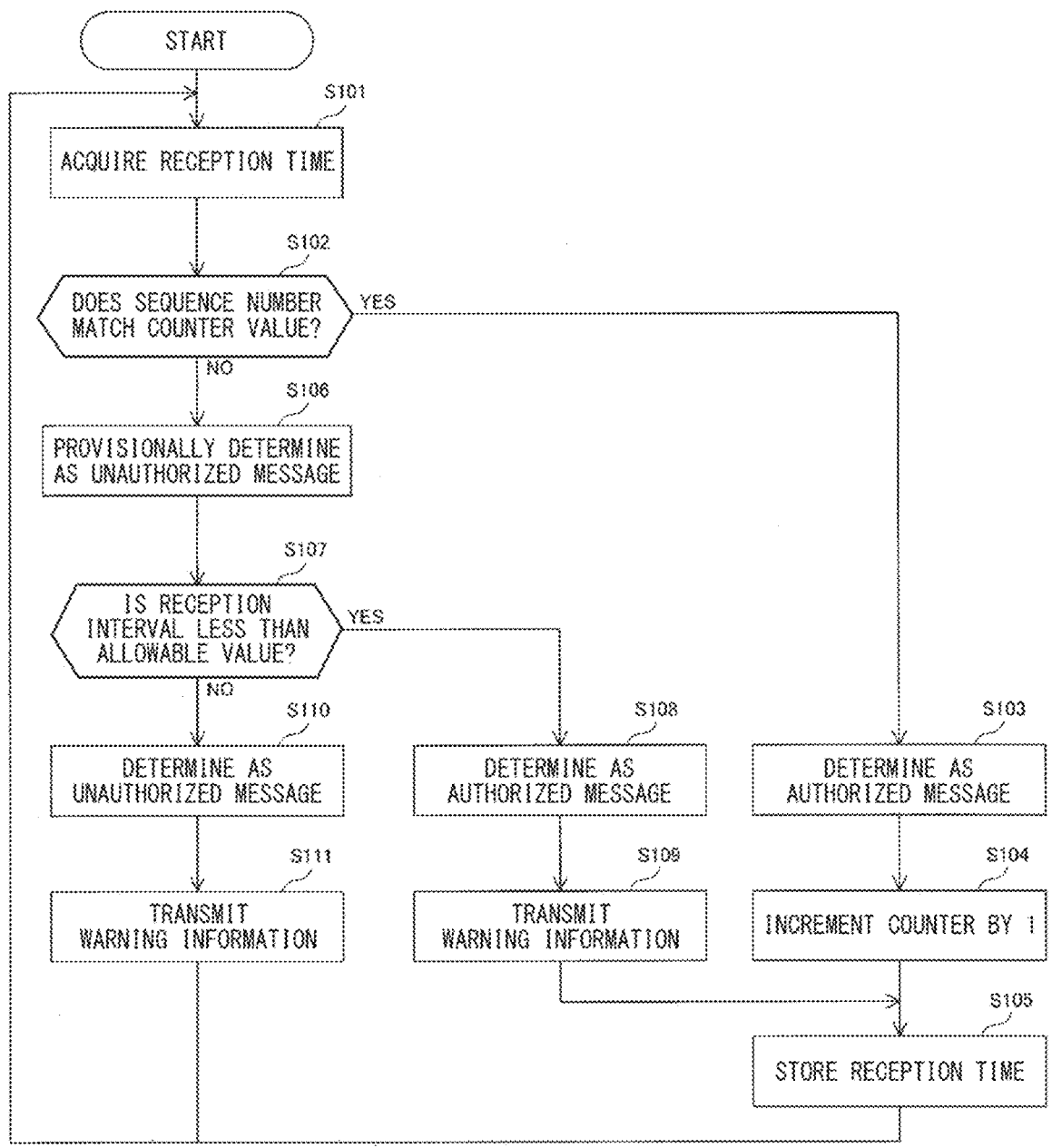
FIG. 8 is a flowchart of an example of an operation procedure when the gateway device performs a detection process in the in-vehicle communication system according to the first embodiment of the present disclosure.

FIG. 8 is a flowchart showing an example of an operation procedure when a gateway device performs a detection process in the in-vehicle communication system according to the first embodiment of the present disclosure. FIG. 8 shows a detection process for messages having a certain same message ID, and a similar detection process is performed on messages having another message ID.

With reference to FIG. 8, first, the gateway device 101 monitors a periodic message and an event message in the in-vehicle communication system 301, and acquires the reception times of the periodic message and the event message (step S101).

Next, the gateway device 101 acquires a sequence number of the received periodic message or event message, and a counter value in the counter unit 53. The gateway device 101 compares the acquired sequence number with the acquired counter value, and when the sequence number matches the counter value (YES in step S102), determines that the received message is an authorized message (step S103).

Next, upon determining that the received message is an authorized message, the gateway device 101 increments the counter value of the counter unit 53 by 1 (step S104).

Next, the gateway device 101 stores the reception time of the received message in the storage unit 55 (step S105), and continues monitoring of a periodic message and an event message in the in-vehicle communication system 301 (step S101).

Meanwhile, when the acquired sequence number does not match the acquired counter value (NO in step S102), the gateway device 101 provisionally determines that the received message is an unauthorized message (step S106).

Next, the gateway device 101 determines whether or not a reception interval between a first message provisionally determined to be an unauthorized message, and a second message having a sequence number that is one count prior to the first message, is less than the allowable value of the periodic message. When the reception interval between the first message and the second message is less than the allowable value of the periodic message (YES in step S107), the gateway device 101 corrects the detection result regarding the first message having been provisionally determined to be an unauthorized message, and determines that the first message is an authorized message (step S108).

After correcting the detection result, the gateway device 101 determines that an unauthorized message has been received prior to the first message, and transmits warning information indicating that the unauthorized message is being transmitted through the bus 13, to the higher-order device located inside or outside the vehicle 1 (step S109).

Next, the gateway device 101 stores the reception time of the received message in the storage unit 55 (step S105), and continues monitoring of a periodic message and an event message in the in-vehicle communication system 301 (step S101).

When the reception interval between the first message and the second message is equal to or greater than the allowable value of the periodic message (NO in step S107), the gateway device 101 maintains the detection result regarding the first message having been provisionally determined to be an unauthorized message, and conclusively determines that the first message is an unauthorized message (step S110).

Next, the gateway device 101 transmits warning information indicating that the unauthorized message is being transmitted through the bus 13, to the higher-order device located inside or outside the vehicle 1 (step S111), and continues monitoring of a periodic message and an event message in the in-vehicle communication system 301 (step S101),

[Modification 1]

Figure 9:
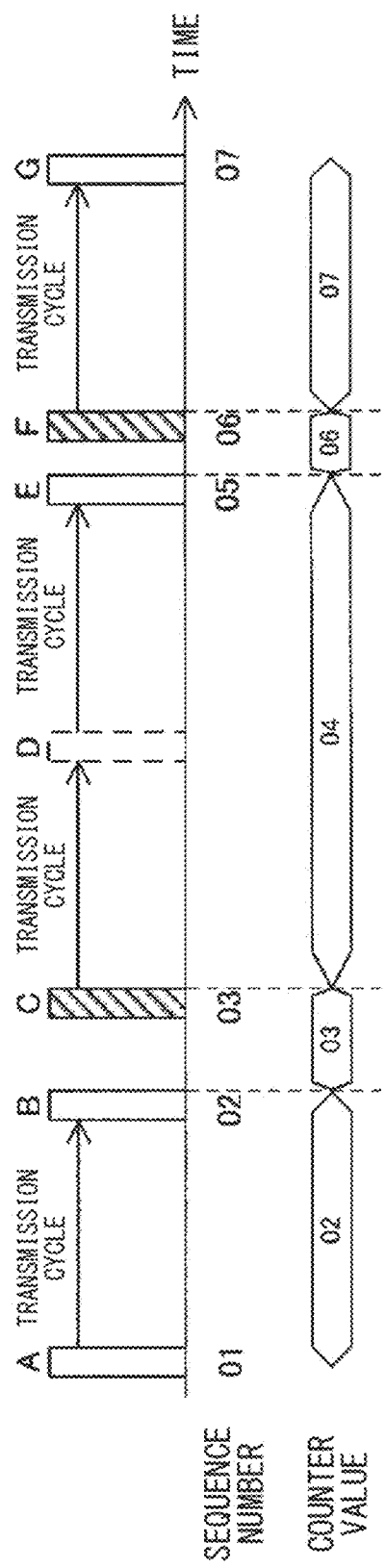
FIG. 9 shows an example of a case Where some periodic messages are missing in the in-vehicle communication system according to modification 1 of the first embodiment of the present disclosure.

FIG. 9 shows an example of a case where some periodic messages are missing in the in-vehicle communication system according to modification 1 of the first embodiment of the present disclosure.

With reference to FIG. 9, the detection unit 54 determines that each of messages A to C is an authorized message because the sequence number matches the counter value. After reception of the message C, the gateway device 101 will receive a periodic message D. However, since the periodic message D is missing for some reason, the gateway device 101 receives a periodic message E to which sequence number "05" is assigned.

In this case, since the counter value is "04" and does not match the sequence number "05" of the periodic message E, the detection unit 54 provisionally determines that the periodic message E being an authorized message is an unauthorized message.

Therefore, in the gateway device 101 according to modification 1 of the first embodiment, the detection unit 54 detects missing of periodic messages, based on the monitoring result by the monitoring unit 52, corrects the counter value, based on the number of missing periodic messages, compares the sequence number with the corrected counter value, and performs provisional determination for detection of an unauthorized message, based on the comparison result.

More specifically, after performing the provisional determination that the periodic message F is an unauthorized message, the detection unit 54 performs a process of detecting whether or not there is any missing periodic message before performing a process of correcting the detection result.

Specifically, the detection unit 54 acquires, from the storage unit 55, the reception time of the message E the reception time of the message C which is a message received last time, and the predetermined transmission cycle of the periodic message. The detection unit 54 calculates a reception interval from a difference between the acquired reception times of the messages E and C. The detection unit 54 compares the calculated reception interval with the predetermined transmission cycle of the periodic message. In the example shown in FIG. 9, the reception interval between the message E and the message C is twice the allowable value, i.e., the gateway device 101 has received the message E with a delay of about one cycle from reception of the message C.

In this case, the detection unit 54 determines that one periodic message is missing, and adds the number of the missing periodic message to the counter value "04" acquired from the storage unit 55 to correct the counter value to "05". The detection unit 54 compares the corrected counter value with the sequence number of the periodic message E. Since the counter value "05" matches the sequence number "05" of the periodic message E, the detection unit 54 corrects the result of the provisional determination to provisionally determine that the periodic message E is an authorized message.

Furthermore, the detection unit 54 outputs, to the counter unit 53, missing information indicating the number of missing periodic messages. Upon receiving the missing information from the detection unit 54, the counter unit 53 changes the current counter value to "05" and stores the counter value in the storage unit 55.

Figure 10:
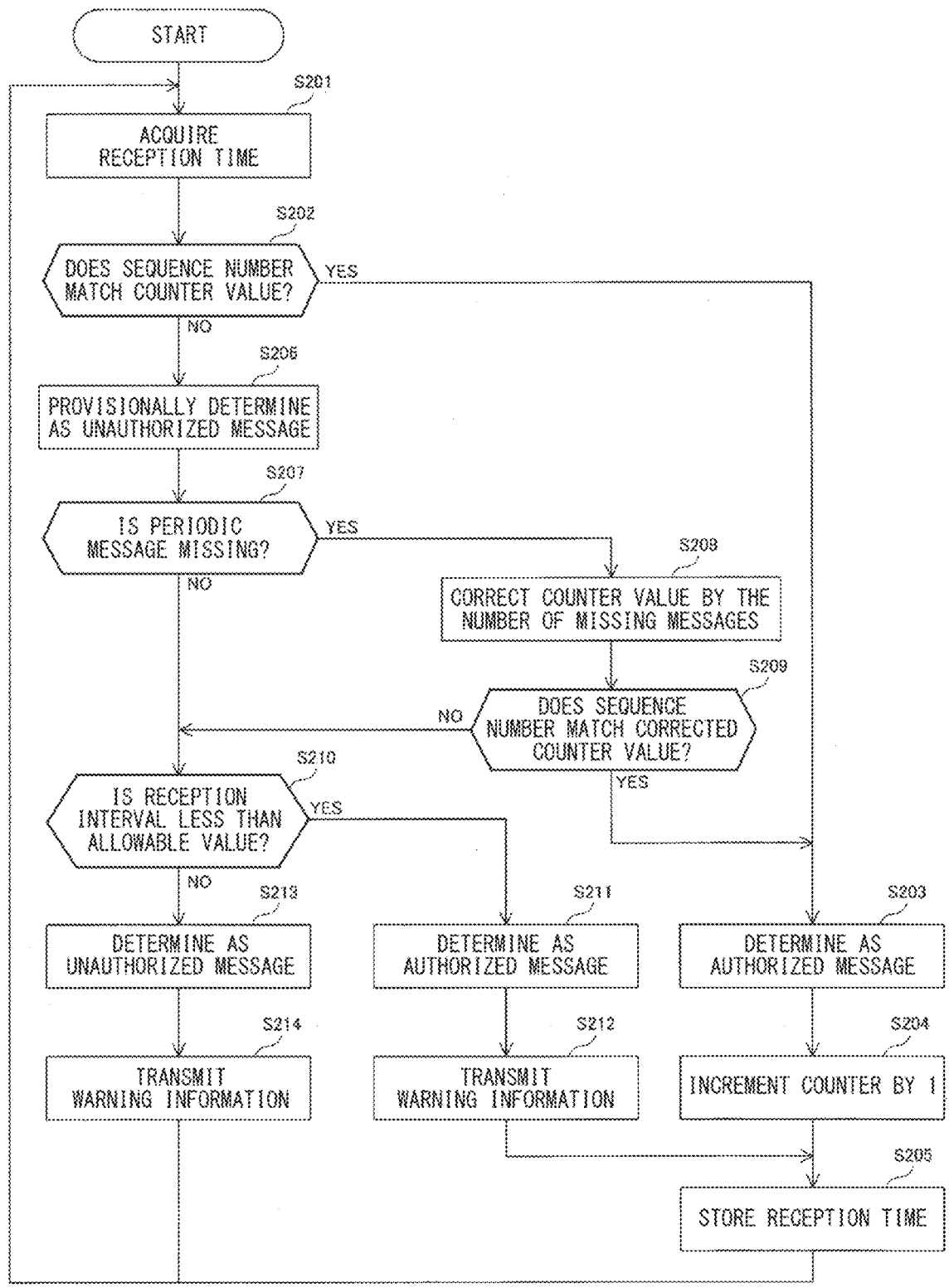
FIG. 10 is a flowchart of an example of an operation procedure when the gateway device performs a detection process in the in-vehicle communication system according to modification 1 of the first embodiment of the present disclosure.

FIG. 10 is a flowchart of an example of an operation procedure when the gateway device performs a detection process in the in-vehicle communication system according to modification 1 of the first embodiment of the present disclosure. FIG. 10 shows a detection process of detecting messages having a certain same message ID, and a similar detection process is performed on messages having another message ID.

With reference to FIG. 10, first, the gateway device 101 monitors a periodic message and an event message in the in-vehicle communication system 301, and acquires the reception times of the periodic message and the event message (step S201).

Next, the gateway device 101 acquires a sequence number of the received periodic message or event message, and a counter value in the counter unit 53. The gateway device 101 compares the acquired sequence number with the acquired counter value, and when the sequence number matches the counter value (YES in step S202), determines that the received message is an authorized message (step S203).

Next, upon determining that the received message is an authorized message, the gateway device 101 increments the counter value of the counter unit 53 by 1 (step S204).

Next, the gateway device 101 stores the reception time of the received message in the storage unit 55 (step S205), and continues monitoring of a periodic message and an event message in the in-vehicle communication system 301 (step S201).

Meanwhile, when the acquired sequence number does not match the acquired counter value (NO in step S202), the gateway device 101 provisionally determines that the received message is an unauthorized message (step S206).

Next, the gateway device 101 determines whether or not missing of periodic messages has occurred prior to the received message, and when missing of periodic messages has been detected (YES in step S207), increments the counter value in the counter unit 53 by the number of missing periodic messages (step S208).

Next, the gateway device 101 corrects the counter value acquired from the storage unit 55, based on the detected number of missing periodic messages, and compares the acquired sequence number with the corrected counter value. When the sequence number matches the corrected counter value (YES in step S209), the gateway device 101 determines that the received message is an authorized message (step S203).

Meanwhile, when the acquired sequence number does not match the corrected counter value (NO in step S209), the gateway device 101 again provisionally determines that the received message is an unauthorized message.

Since the processes in steps S210 to S214 are identical to those in steps S107 to S111 shown in FIG. 8, detailed description thereof will be omitted.

Meanwhile, there is a demand for a technology capable of accurately detecting an unauthorized message in an in-vehicle communication system.

For example, a method of detecting an unauthorized message, based on sequence numbers that are sequentially assigned to messages to be periodically and non-periodically transmitted, is conceivable.

In such a method, however, it is difficult to detect an unauthorized message having a sequence number masquerading as a sequence number of an authorized message originally to be transmitted next, and there is a possibility of erroneous detection in which an authorized message transmitted next to an unauthorized message is detected as an unauthorized message.

In contrast to the above method, in the gateway device 101 according to the first embodiment of the present disclosure, the detection unit 54 performs conclusive determination for detection of an unauthorized message, based on an interval of messages that satisfy the predetermined condition regarding the sequence number, among messages to which the same identification information is assigned, and on the predetermined transmission cycle of the periodic message, and performs a correction process of correcting the detection result regarding an unauthorized message in the provisional determination. Thus, even if erroneous determination of an unauthorized message to be an authorized message causes a subsequent authorized message to be erroneously detected as an unauthorized message, the gateway device 101 can verify validity of the detection result, and correct the detection result according to need.

Therefore, the gateway device 101 according to the first embodiment of the present disclosure can more accurately detect an unauthorized message in the in-vehicle communication system 301.

[Modification 2]

In the above description, the sequence number of the message that the control device 122A firstly transmits and the initial counter value of the counter unit 53 are "01". However, the sequence number of the message that the control device 122A firstly transmits and the initial counter value of the counter unit 53 are not limited to "01", and may be another value.

In the above description, the detection unit 54 determines a message to be an authorized message when the sequence number of the message matches the counter value. However, the detection unit 54 may determine a message to be an authorized message when a difference between the sequence number and the counter value of the message is a predetermined value.

In the above description, the sequence number and the counter value of each message are incremented 1 by 1. However, the sequence number and the counter value may be incremented or decremented in units of another value, or may be regularly changed.

Hereinafter, other embodiments of the present disclosure will be described with reference to the drawings. In the drawings, the same or corresponding parts are denoted by the same reference signs, and descriptions thereof are not repeated.

SECOND EMBODIMENT

The present embodiment relates to an in-vehicle communication system in which the message transmission method and the unauthorized message detection method are changed from those of the in-vehicle communication system 301 according to the first embodiment. The in-vehicle communication system of the second embodiment is identical to that of the first embodiment except for the contents described belo.

Figure 11:
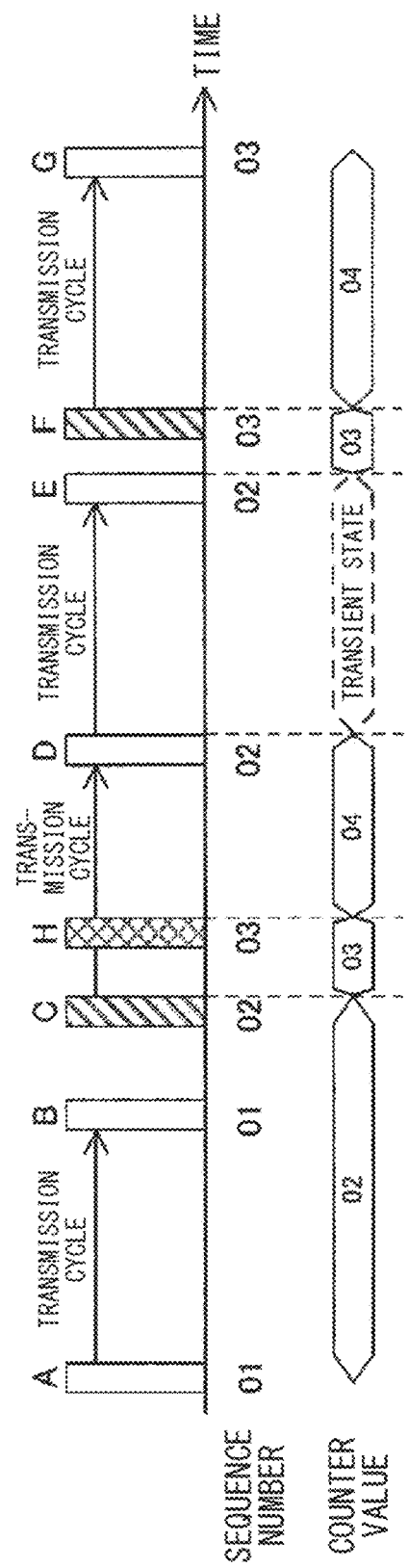
FIG. 11 shows an example of a case where a received message is determined to be an unauthorized message in a gateway device according to a second embodiment of the present disclosure.

FIG. 11 shows an example of a case where a received message is determined to be an unauthorized message in a gateway device according to the second embodiment of the present disclosure.

With reference to FIG. 11, sequence number "01" is assigned to a periodic message A that the control device 122A firstly transmits. An initial counter value of the counter unit 53 in the gateway device 101 is set to "02".

In the present embodiment, a sequence number (second sequence number), which is not changed when a periodic message is transmitted and is changed each time an event message is transmitted, is assigned to the message.

More specifically, the control device 122A adds the same sequence number "01" to the periodic message A and a periodic message B to be transmitted next to the periodic message A. The control device 122A increments the sequence number by 1, and adds sequence number "02" to an event message C to be transmitted next to the periodic message B. The control device 122A adds the same sequence number "02" as that of the event message C, to a periodic message D to be transmitted next to the event message C.

The detection unit 54 determines whether the received message is a periodic message or an event message. More specifically, upon receiving a message reception notification from the communication processing unit 51, the detection unit 54 acquires, from the storage unit 55, the reception time of a message that is temporally preceding the currently received message, i.e., a message received last time, and the predetermined transmission cycle of the periodic message. The detection unit 54 calculates a reception interval between the currently received message and the message received last time. The detection unit 54 compares the calculated reception interval with the predetermined transmission cycle, and determines whether or not the reception interval matches the predetermined transmission cycle. For example, when an absolute value of a difference between the reception interval and the transmission cycle is less than a predetermined value, the detection unit 54 determines that the reception interval matches the transmission cycle.

For example, when the gateway device 101 has received the message B, the detection unit 54 calculates a reception interval between the message B and the message A received last time. In this example, the reception interval between the message B and the message A matches the predetermined transmission cycle. Therefore, the detection unit 54 determines that the message B is a periodic message.

Next, when the gateway device 101 has received the message C, the detection unit 54 calculates a reception interval between the message C and the message B received last time. In this embodiment, the reception interval between the message C and the message B is less than the predetermined transmission cycle. Therefore, the detection unit 54 determines that the message C is an event message.

Next, upon determining that the received message is an event message, the detection unit 54 acquires, from the storage unit 55, the sequence number of the event message and the counter value. The detection unit 54 compares the acquired sequence number with the acquired counter value, and when the sequence number and the counter value have the same value, determines that the event message is an authorized message.

Specifically, the sequence number of the event message C received by the gateway device 101 is "02" and matches the counter value "02". Therefore, the detection unit 54 determines that the event message C is an authorized message. Upon determining that the event message C is an authorized message, the detection unit 54 outputs a counter value change notification to the counter unit 53.

The counter unit 53 changes the counter value when the gateway device 101 has received the event message out of the periodic message and the event message. More specifically, upon receiving the counter value change notification from the detection unit 54, the counter unit 53 increments the counter value by 1. The counter unit 53 stores the incremented counter value in the storage unit 55.

Meanwhile, when the sequence number is different from the counter value, the detection unit 54 determines that the received event message is an unauthorized message.

For example, it is assumed that the gateway device 101 receives an unauthorized message H after having received the messages A to C. After the gateway device 101 has received the messages A to C, the counter unit 53 sets the counter value to "03". Thereafter, if the gateway device 101 has received a message H with sequence number "05", the detection unit 54 determines that the message H is an unauthorized message because the sequence number does not match the counter value.

However, if the sequence number of the unauthorized message H is "03" that is the same as the counter value of the counter unit 53, the unauthorized message H is determined to be an authorized message, and the message D being an authorized message is determined to be an unauthorized message.

Therefore, as in the first embodiment, also in the present embodiment, when the detection unit 54 has detected an unauthorized message in provisional determination, the detection unit 54 performs conclusive determination for detection of the unauthorized message, based on an interval of messages that satisfy the predetermined condition regarding the sequence number, among messages which are monitored by the monitoring unit 52 and to which the same identification information is assigned, acid on the predetermined transmission cycle of the periodic message, and the detection unit 54 performs a correction process of correcting the detection result regarding an unauthorized message in the provisional determination. In the present embodiment, the interval of the messages is a reception interval between the message D as a third message and the message C as a fourth message having the same sequence number as the third message.

More specifically, first, the gateway device 101 receives the messages A to C in order. The detection unit 54 determines that each of the periodic messages A and B is an authorized message because the reception interval matches the predetermined transmission cycle. The detection unit 54 determines that the event message C is an authorized message because the sequence number matches the counter value. In this state, the counter value of the counter unit 53 is incremented by 1 from the initial value and is set to "03".

Next, the gateway device 101 receives the unauthorized message H. The detection unit 54 determines that the unauthorized message H is an event message because a reception interval between the unauthorized message H and the event message C received last time is less than the predetermined transmission cycle. Then, the detection unit 54 determines that the unauthorized message H is an authorized message because the sequence number "03", which is the same as the counter value, is assigned to the unauthorized message H. The counter unit 53 increments the counter value to "04".

Next, the gateway device 101 receives the message D. This message D is a periodic message transmitted next to the event message C from the control device 122A, and therefore has the same sequence number "02" as the event message C. However, the detection unit 54 determines that the periodic message D is an event message because the reception interval between the periodic message D and the unauthorized message H received last time is less than the predetermined transmission cycle. Then, since the counter value of the counter unit 53 is "04" and does not match the sequence number of the periodic message D, the detection unit 54 provisionally determines that the periodic message D, which is originally an authorized message, is an unauthorized message.

Next, the detection unit 54 determines validity of the detection result indicating that the periodic message D is an unauthorized message. As described above, the detection unit 54 determines whether or not to correct the detection result, based on the interval of messages that satisfy the predetermined condition regarding the sequence number, among messages to which the same identification information is assigned, and on the predetermined transmission cycle of the periodic message.

In the present embodiment, the interval of messages that satisfy the predetermined condition is not an interval of temporally successive messages that the gateway device 101 has actually received, but an interval between a certain message and a latest message having the same sequence number as the certain message, i.e., an interval between a certain message and a message that should originally be received just prior to the certain message.

Specifically, the latest message having the same sequence number "02" as the periodic message D determined to be an unauthorized message is the event message C. Therefore, the detection unit 54 determines whether or not to correct the detection result, based on a reception interval between the periodic message D as the third message and the message C as the fourth message, and on the transmission cycle of the periodic message.

More specifically, the detection unit 54 acquires, from the storage unit 55, the reception times of the message D and the message C, and the predetermined transmission cycle of the periodic message. The detection unit 54 calculates a reception interval from a difference between the acquired reception times of the messages D and C. The detection unit 54 compares the calculated reception interval with the predetermined transmission cycle of the periodic message, and determines whether or not the reception interval matches the predetermined transmission cycle.

In the present embodiment, the reception interval between the message D and the message C is 20 ms which is the length of the predetermined transmission cycle. In this case, the message D is highly likely to be an authorized periodic message transmitted after the predetermined transmission cycle of 20 ms from transmission of the message C being an authorized message. Therefore, when the reception interval matches the predetermined transmission cycle, the detection unit 54 corrects the detection result indicating that the message D is an unauthorized message, and determines that the message D is an authorized message.

After correcting the detection result, the detection unit 54 determines that an unauthorized message has been received prior to the message D, and outputs a detection result indicating that the unauthorized message has been detected, to the communication processing unit 51.

Meanwhile, when the reception interval between the message D and the message C does not match the predetermined transmission cycle, the message D is highly likely to be an unauthorized message. Therefore, the detection unit 54 maintains the detection result, determines that the message D is an unauthorized message, and outputs a detection result indicating that the unauthorized message has been detected, to the communication processing unit 51.

Upon receiving the detection result from the detection unit 54, the communication processing unit 51 transmits warning information indicating that the unauthorized message is being transmitted through the bus ii to the higher-order device located inside or outside the vehicle 1.

[Modification 1]

The detection unit 54 may transition to a transient state after the detection result correction process, and in the transient state, may detect an unauthorized message, based on a reception interval between messages having been temporally successively received, among messages which are monitored by the monitoring unit 52 and to which the same identification information is assigned, and on the sequence numbers of the received messages. More specifically, the detection unit 54 outputs a transition notification to the counter unit 53 after determining again that the periodic message D is an authorized message.

Upon receiving the transition notification from the detection unit 54, the counter unit 53 sets the counter value to "none", That is, the detection unit 54 in the transient state does not use the counter value for determination of an unauthorized message.

Thereafter, the gateway device 101 receives a message E after one cycle from reception of the periodic message D. Based on the reception interval between the received message E and the periodic message D, the detection unit 54 determines that the message E is a periodic message, and an authorized message.

The detection unit 54 acquires, from the storage unit 55, the sequence number of the periodic message E determined to be an authorized message in the transient state, and outputs, to the counter unit 53, sequence number information indicating the sequence number of the periodic message E.

Upon receiving the sequence number information from the detection unit 54, the counter unit 53 newly sets "03", as the counter value, which is obtained by incrementing by 1 the value of the sequence number indicated by the sequence number information, thereby canceling the transient state.

Meanwhile, when the gateway device 101 has received an unauthorized message while the detection unit 54 is in the transient state, the gateway device 101 performs a process as follows.

Figure 12:
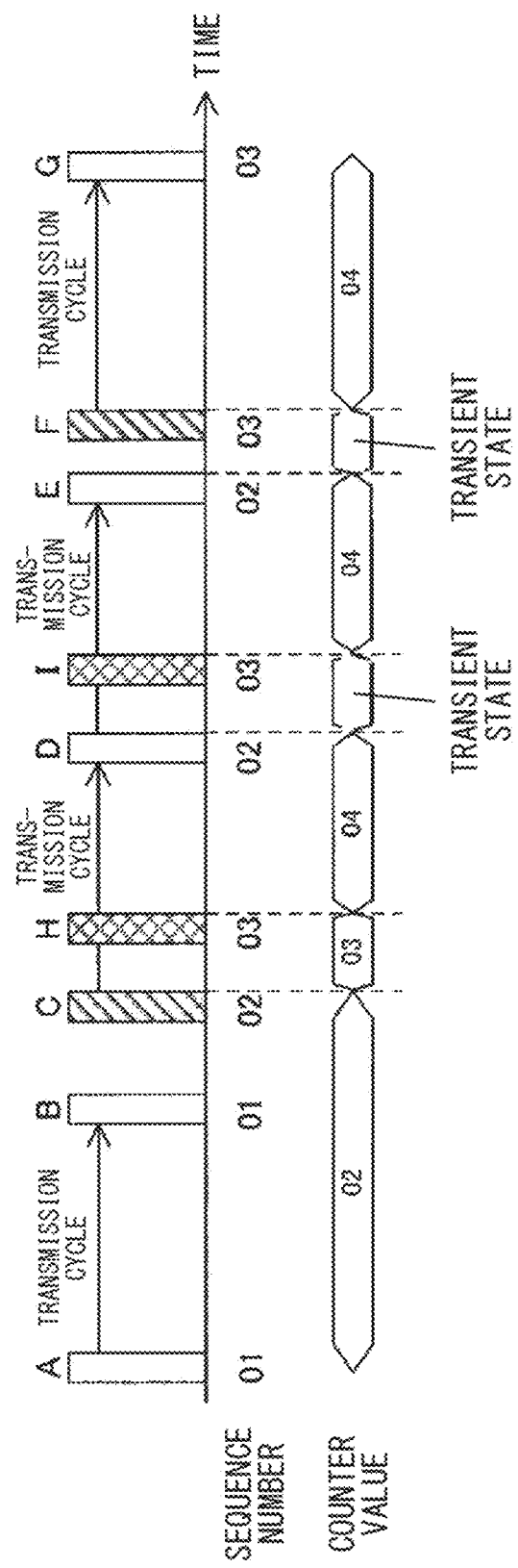
FIG. 12 shows an example of a case where a received message is determined to be an unauthorized message in the gateway device according to the second embodiment of the present disclosure.

FIG. 12 shows an example of a case where a received message is determined to be an unauthorized message in the gateway device according to the second embodiment of the present disclosure. FIG. 12 shows a case where, in the state shown in FIG. 11, an unauthorized message I having sequence number "03" is received while the detection unit is in the transient state.

With reference to FIG. 12, the gateway device 101 receives the message I before one cycle passes from reception of the periodic message D. The detection unit 54 determines that the message I is an event message, based on a reception interval between the received message I and the periodic message D.

The detection unit 54 acquires, from the storage unit 55, the sequence number of the message I determined to be an event message and the sequence number of the periodic message D received last time. The detection unit 54 compares the sequence number of the acquired message I with the sequence number of the periodic message D. The detection unit 54 determines that the received message I is an authorized message when the sequence numbers have different values, and determines that the received message I is an unauthorized message when the sequence numbers have the same value. In this embodiment, the sequence numbers of the message I and the message D have different values. Therefore, the detection unit 54 determines that the message I being an unauthorized message is an authorized message.

The detection unit 54 outputs, to the counter unit 53, sequence number information indicating the sequence number of the message I determined to be an authorized message in the transient state.

Upon receiving the sequence number information from the detection unit 54, the counter unit 53 newly sets "04", as the counter value, which is obtained by incrementing by 1 the value of the sequence number indicated by the sequence number information, thereby canceling the transient state.

Thereafter, the gateway device 101 receives a periodic message E. The periodic message E is a periodic message transmitted next to the periodic message D from the control device 122A, and therefore has the same sequence number "02" as the periodic message D. However, since the reception interval between the periodic message E and the unauthorized message I received last time is less than the predetermined transmission cycle, the detection unit 54 determines that the periodic message E is an event message. Then, since the counter value of the counter unit 53 is "04" and does not match the sequence number of the periodic message E, the detection unit 54 provisionally determines that the periodic message E being originally an authorized message is an unauthorized message.

Please cancel the original Abstract at page 73 in its entirety and insert therefor the following replacement Abstract on a separate sheet as follows:

Next, as described above, the detection unit 54 determines validity of the detection result indicating that the periodic message E is an unauthorized message. That is, the detection unit 54 determines whether or not a reception interval between the periodic message F determined to be an unauthorized message and the periodic message D that is a latest message having the same sequence number "02" as the periodic message F is less than the allowable value described above.

In this embodiment, the reception interval between the periodic message E and the periodic message D matches the predetermined transmission cycle. Therefore, the detection unit 54 corrects the detection result indicating that the message E is an unauthorized message, and determines that the message E is an authorized message.

After correcting the detection result, the detection unit 54 determines that an unauthorized message has been received prior to the message F, outputs a detection result indicating that the unauthorized message has been detected to the communication processing unit 51, and transitions to the transient state again.

[Operation Flow]

Figure 13:
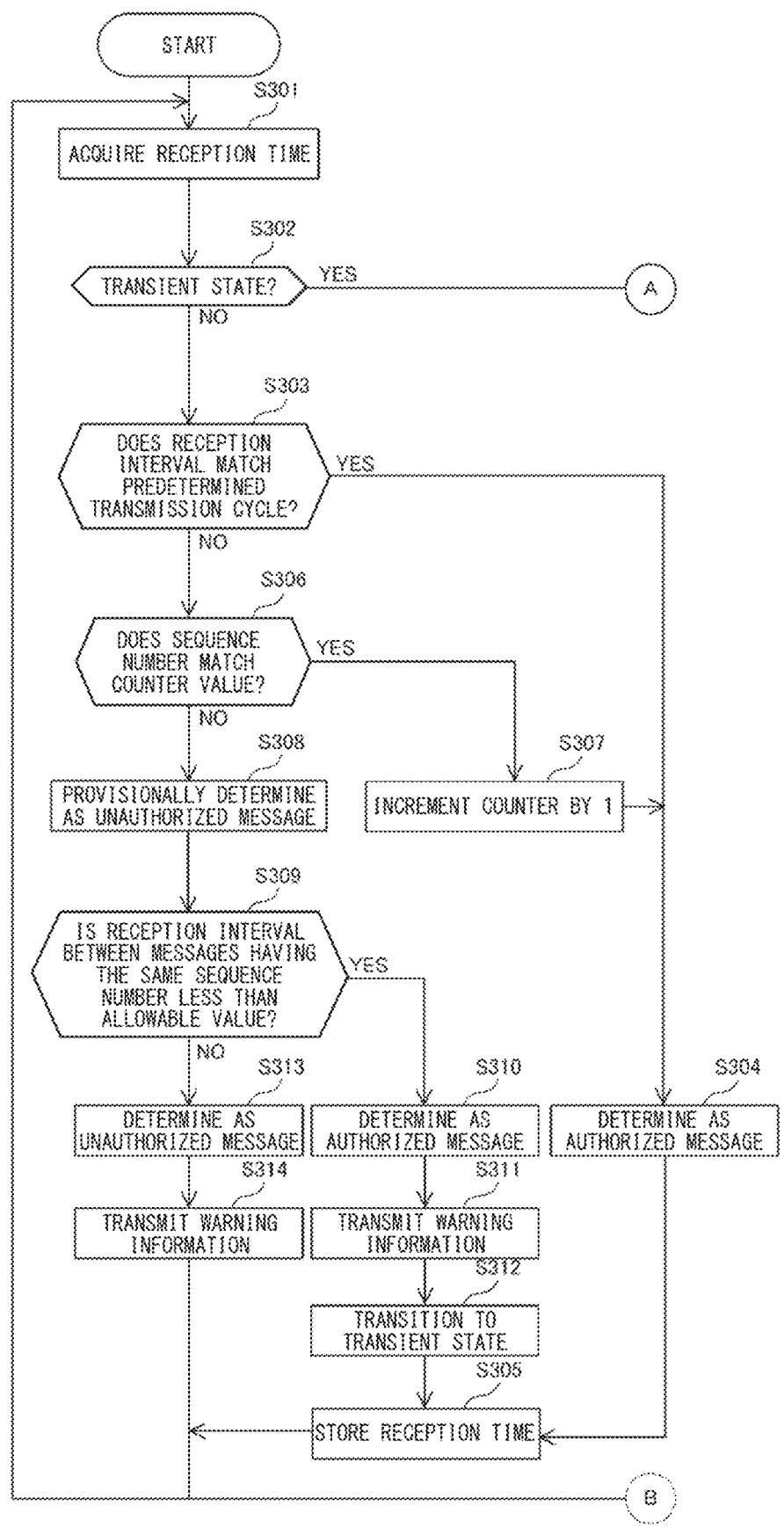
FIG. 13 is a flowchart of an example of an operation procedure when the gateway device performs a detection process in the in-vehicle communication system according to the second embodiment of the present disclosure.
Figure 14:
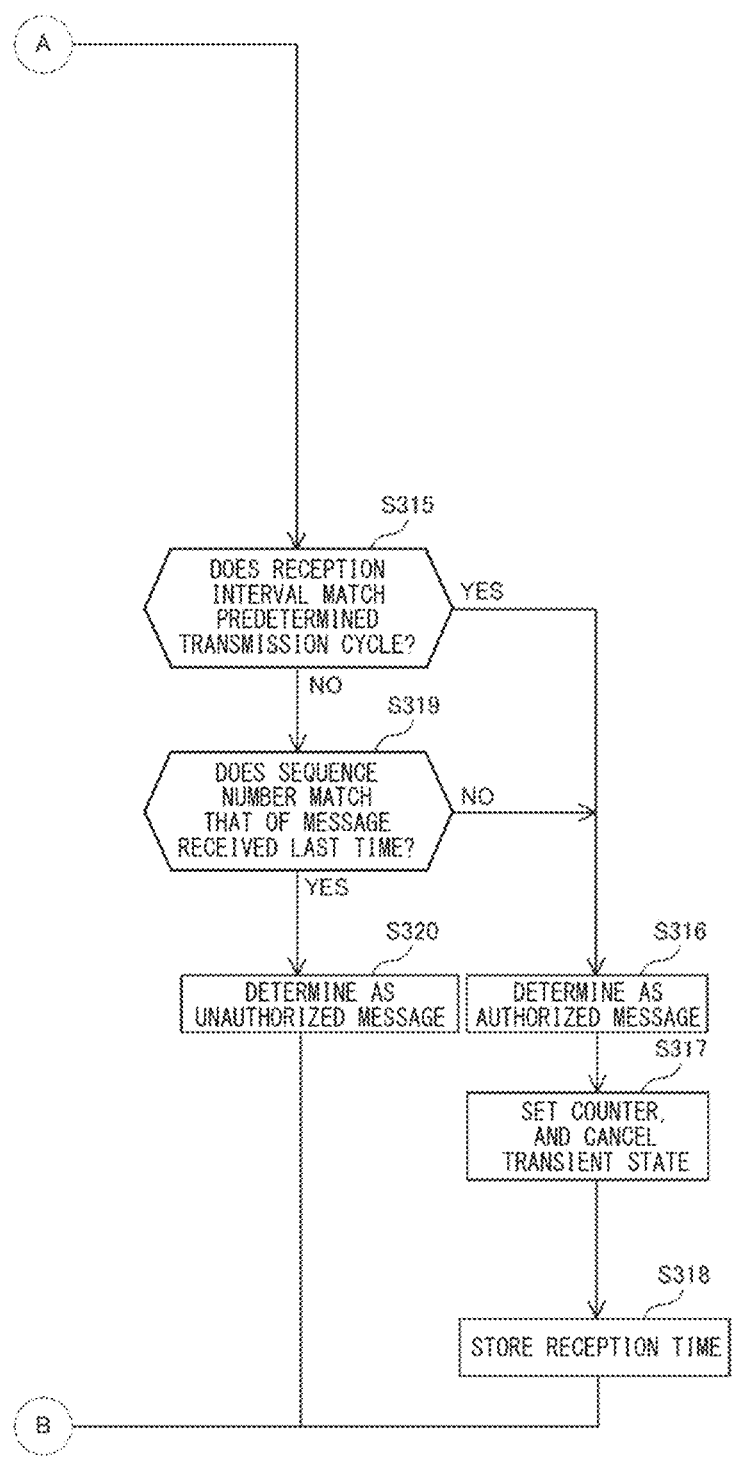
FIG. 14 is a flowchart of an example of an operation procedure when the gateway device performs a detection process in the in-vehicle communication system according to the second embodiment of the present disclosure.

FIG. 13 and FIG. 14 are flowcharts showing an example of an operation procedure when a gateway device performs a detection process in the in-vehicle communication system according to the second embodiment of the present disclosure. FIG. 13 and FIG. 14 show a detection process for messages having a certain same message ID, and a similar detection process is performed on messages having another message ID.

With reference to FIG. 13, first, the gateway device 101 monitors a periodic message and an event message in the in-vehicle communication system 301, and acquires the reception times of the periodic message and the event message (step S301).

Next, the gateway device 101 confirms whether or not the detection unit 54 is in the transient state. When the detection unit 54 is not in the transient state (NO in step S302), the gateway device 101 determines whether or not a reception interval between a currently received message and a message received last time matches the predetermined transmission cycle. When the reception interval of the messages matches the predetermined transmission cycle (YES in step S303), the gateway device 101 determines that the received message is a periodic message and is an authorized message (step S304).

Next, the gateway device 101 stores the reception time of the received message in the storage unit 55 (step S305), and continues monitoring of a periodic message and an event message in the in-vehicle communication system 301 (step S301).

Meanwhile, when the reception interval of the messages does not match the predetermined transmission cycle (NO in step S303), the gateway device 101 determines that the received message is an event message, and acquires the sequence number of this message and the counter value in the counter unit 53. The gateway device 101 compares the acquired sequence number with the acquired counter value. When the sequence number matches the counter value (YES in step S306), the gateway device 101 increments the counter value in the counter unit 53 by 1 (step S307), and determines that the received message is an authorized message (step S304).

Meanwhile, when the acquired sequence number does not match the acquired counter value (NO in step S306), the gateway device 101 provisionally determines that the received message is an unauthorized message (step S308).

Next, the gateway device 101 determines whether or not a reception interval between a third message provisionally determined to be an unauthorized message and a fourth message that is a latest message having the same sequence number as the third message is less than the allowable value of the periodic message. When the reception interval between the third message and the fourth message is less than the allowable value of the periodic message (YES in step S309), the gateway device 101 corrects the detection result regarding the third message provisionally determined to be an unauthorized message, and determines that the third message is an authorized message (step S310).

After correcting the detection result, the gateway device 101 determines that an unauthorized message has been received prior to the third message, and transmits warning information indicating that the unauthorized message is being transmitted through the bus 13, to the higher-order device located inside or outside the vehicle 1 (step S311).

Next, the detection unit 54 in the gateway device 101 transitions to the transient state (step S312), stores the reception time of the received message in the storage unit 55 (step S305), and continues monitoring of a periodic message and an event message in the in-vehicle communication system 301 (step S301).

Mean when the reception interval between the third message and the fourth message is equal to or greater than the allowable value of the periodic message (NO in step S309), the gateway device 101 maintains the detection result regarding the third message provisionally determined to be an unauthorized message, and conclusively determines that the third message is an unauthorized message (step S313).

Next, the gateway device 101 transmits warning information indicating that the unauthorized message is being transmitted through the bus 13, to the higher-order device located inside or outside the vehicle 1 (step S314), and continues monitoring of a periodic message and an event message in the in-vehicle communication system 301 (step S301).

Meanwhile, when the detection unit 54 is in the transient state (YES in step S302), the gateway device 101 determines whether or not the reception interval between the currently received message and the message received last time matches the predetermined transmission cycle.

With reference to FIG. 14, when the reception interval of the messages matches the predetermined transmission cycle (YES in step S315), the gateway device 101 determines that the received message is a periodic message and is an authorized message (step S316).

Next, the gateway device 101 acquires the sequence number of the received message from the storage unit 55, and sets the counter value in the counter unit 53 to a value obtained by incrementing the sequence number by 1, thereby canceling the transient state (step S317).

Next, the gateway device 101 stores the reception time of the received message in the storage unit 55 (step S318), and continues monitoring of a periodic message and an event message in the in-vehicle communication system 301 (step S301).

Meanwhile, when the reception interval of the messages does not match the predetermined transmission cycle (NO in step S315), the gateway device 101 determines that the received message is an event message, and acquires, from the storage unit 55, the sequence number of the message and the sequence number of the message received last time. The gateway device 101 compares the acquired sequence numbers with each other, and when the sequence numbers do not match (NO in step S319), determines that the received message is an authorized message (step S316).

Meanwhile, when the acquired sequence numbers match (YES in step S319), the gateway device 101 determines that the received message is an unauthorized message (step S320), and continues monitoring, in the transient state, of a periodic message and an event message in the in-vehicle communication system 301 (step S301).

The detection unit 54 in the gateway device 101 may be configured not to transition to the transient state. Specifically, in the example shown in FIG. 13 and FIG. 14, the detection unit 54 may be configured not to perform the processes in steps S302. S312, and S315 to S320.

[Modification 2]

In the above description, after performing the detection result correction process, the detection unit 54 transitions to the transient state. However, the detection unit 54 may be configured not to transition to the transient state.

More specifically, after performing the detection result correction process, the detection unit 54 outputs a correction completion notification to the counter unit 53. Upon receiving the correction completion notification from the detection unit 54, the counter unit 53 returns the counter value to the last value. For example, in the example shown in FIG. 11, after the detection result regarding the message D provisionally determined to be an unauthorized message has been corrected, the counter unit 53 resets the counter value from the current value "04" to the last value "03".

By resetting the counter value as described above, even when the detection unit 54 does not transition to the transient state, the periodic messages D, E and the event message F to be received later can be received as authorized messages.

[Modification 3]

In the above description, the sequence number of the message that the control device 122A firstly transmits is "01", and the initial counter value of the counter unit 53 is "02". However, the sequence number of the message that the control device 122A firstly transmits and the initial counter value of the counter unit 53 are not limited thereto, and may be other values.

In the above description, when the sequence number of a message matches the counter value, the detection unit 54 determines that this message is an authorized message. However, for example, when a difference between the sequence number of a message and the counter value is a predetermined value, the detection unit 54 may determine that this message is an authorized message.

In the above description, the sequence number and the counter value of each message are incremented 1 by 1. However, the sequence number and the counter value of a message may be incremented or decremented in units of another value, or may be regularly changed.

THIRD EMBODIMENT

The present embodiment relates to an in-vehicle communication system in which the unauthorized message detection method is changed from that of the in-vehicle communication system 301 according to the first embodiment. The third embodiment is identical to the in-vehicle communication system according to the first embodiment except for the contents described below.

Figure 15:
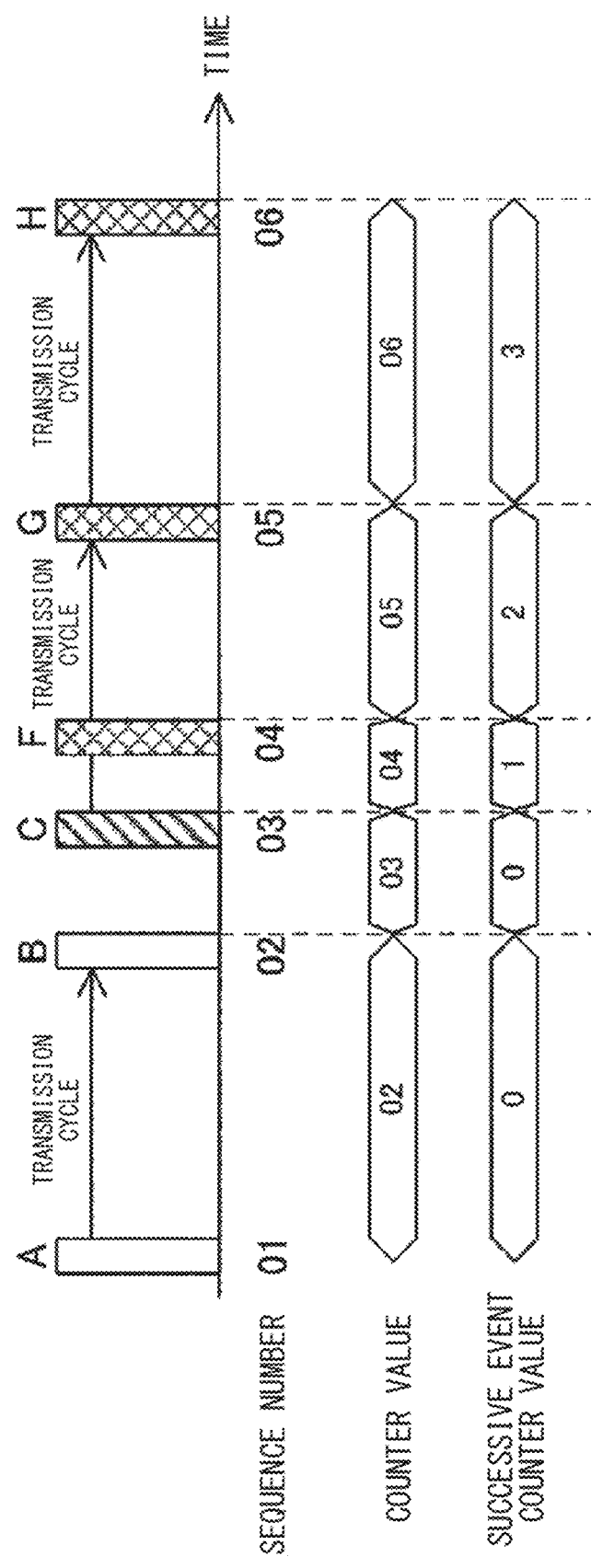
FIG. 15 shows an example of a case where a received message is determined to be an unauthorized message in a gateway device according to a third embodiment of the present disclosure.

FIG. 15 shows an example of a case where a received message is determined to be an unauthorized message in a gateway device according to the third embodiment of the present disclosure. FIG. 15 shows a case where the gateway device receives unauthorized messages F, G, H.

With reference to FIG. 15, sequence number "01" is assigned to a periodic message A that the control device 122A firstly transmits. A sequence number that is changed each time a periodic message or an event message is transmitted is assigned to the message.

An initial counter value of the counter unit 53 in the gateway device 101 is set to "02". The counter unit 53 changes the counter value when the gateway device 101 has received each of a periodic message and an event message, and stores the counter value in the storage unit 55.

The counter unit 53 has a successive event counter value, in addition to the counter value. The initial value of the successive event counter value is set to "0". The counter unit 53 changes the successive event counter value when the gateway device 101 has received an event message, and stores the counter value in the storage unit 55.

In the in-vehicle communication system 301, the monitoring unit 52 monitors a periodic message being periodically transmitted, and two or more event messages that are transmitted non-periodically and successively with an interval shorter than the transmission cycle of the periodic message.

More specifically, the monitoring unit 52 monitors messages to be relayed by the communication processing unit 51 to acquire a reception time of a periodic message and a reception time of an event message.

For example, when the communication processing unit 51 has received a periodic message or an event message to be relayed, the monitoring unit 52 confirms: a message ID included in the message received by the communication processing unit 51 and a message ID of the periodic message and a message ID of the event message, which are stored in the storage unit 55 in advance.

When the message ID included in the message received by the communication processing unit 51 matches the message ID stored in the storage unit 55, the monitoring unit 52 recognizes that the message received by the communication processing unit 51 is a message to be relayed, and acquires the reception time of the message with reference to a time stamp assigned to the message.

Upon acquiring the reception time, the monitoring unit 52 outputs, to the detection unit 54, reception information indicating the acquired reception time in association with the sequence number.

Based on the monitoring result by the monitoring unit 52, the detection unit 54 counts the number of successively transmitted event messages, and detects an unauthorized message, based on the counting result.

More specifically, upon receiving the reception information from the monitoring unit 52, the detection unit 54 acquires, from the storage unit 55, the reception time of the message received last time and the predetermined transmission cycle of the periodic message. Based on the reception time indicated by the reception information and the acquired reception time, the detection unit 54 calculates a reception interval between the currently received message and the message received last time.

The detection unit 54 determines whether or not the calculated reception interval matches the predetermined transmission cycle. The detection unit 54 determines that the received message is an event message when the reception interval does not match the predetermined transmission cycle, and determines that the received message is a periodic message when the reception interval matches the predetermined transmission cycle.

Specifically, the detection unit 54 determines that the messages A and B, the reception interval between which matches the predetermined transmission cycle, are periodic messages. The detection unit 54 determines that the message C, which has been transmitted with an interval less than the predetermined transmission cycle from the message B, is an event message. Upon receiving the periodic message or the event message, the detection unit 54 outputs type information indicating the type of the message to the counter unit 53.

Upon receiving the type information from the detection unit 54, the counter unit 53 increments the counter value by 1 regardless of the message type indicated by the type information. When the message type indicated by the type information is an event message, the counter unit 53 increments the successive event counter value by 1. When the message type indicated by the type information is a periodic message, the counter unit 53 sets the successive event counter value to "0".

A description will be given of a case where, in the example shown in FIG. 15, after the gateway device 101 has received the periodic messages A, B and the event message C which are authorized messages, the gateway device 101 receives an unauthorized message F masquerading as an event message.

After the gateway device 101 has received the event message C, the counter value in the counter unit 53 is "04" and the successive event counter value is "1".

When the sequence number of the unauthorized message F is "04" that is greater by 1 than the sequence number of the event message C received last time, the detection unit 54 determines that the unauthorized message F is an authorized message because the sequence number matches the counter value. Then, the counter value is set to "05" and the successive event counter value is set to "2" in the counter unit 53.

Next, the gateway device 101 receives an unauthorized message G masquerading as a periodic message that is one cycle delayed from the event message C. Since the sequence number of the unauthorized message G is "05", the detection unit 54 determines that the unauthorized message G is an authorized message. In addition, since the reception interval between the unauthorized message G and the unauthorized message F received last time is less than the predetermined transmission cycle, the detection unit 54 determines that the unauthorized message Cl is an event message. In this case, the counter value is "06" and the successive event counter value is "3" in the counter unit 53.

In the storage unit 55 of the gateway device 101, an upper limit of the successive event counter value is stored in advance. In this embodiment, the upper limit of the successive event counter value is "2", for example. However, the upper limit of the successive event counter value is not limited thereto, and may be set as appropriate.

Each time the detection unit 54 receives an event message, the detection unit 54 acquires, from the storage unit 55, limitation information indicating the upper limit of the successive event counter value. The detection unit 54 determines that the unauthorized message Cl is an event message, acquires the limitation information and the successive event counter value from the storage unit 55, and performs comparison.

Since the successive event counter value "3" acquired from the storage unit 55 exceeds the upper limit "2" of the successive event counter value, the detection unit 54 determines that an unauthorized message has been received prior to the unauthorized message G, and outputs, to the communication processing unit 51, a detection result indicating that the unauthorized message has been detected.

Upon receiving the detection result from the detection unit 54, the communication processing unit 51 transmits warning information indicating that the unauthorized message is being transmitted through the bus 13, to the higher-order device located inside or outside the vehicle 1.

[Operation Flow]

Figure 16:
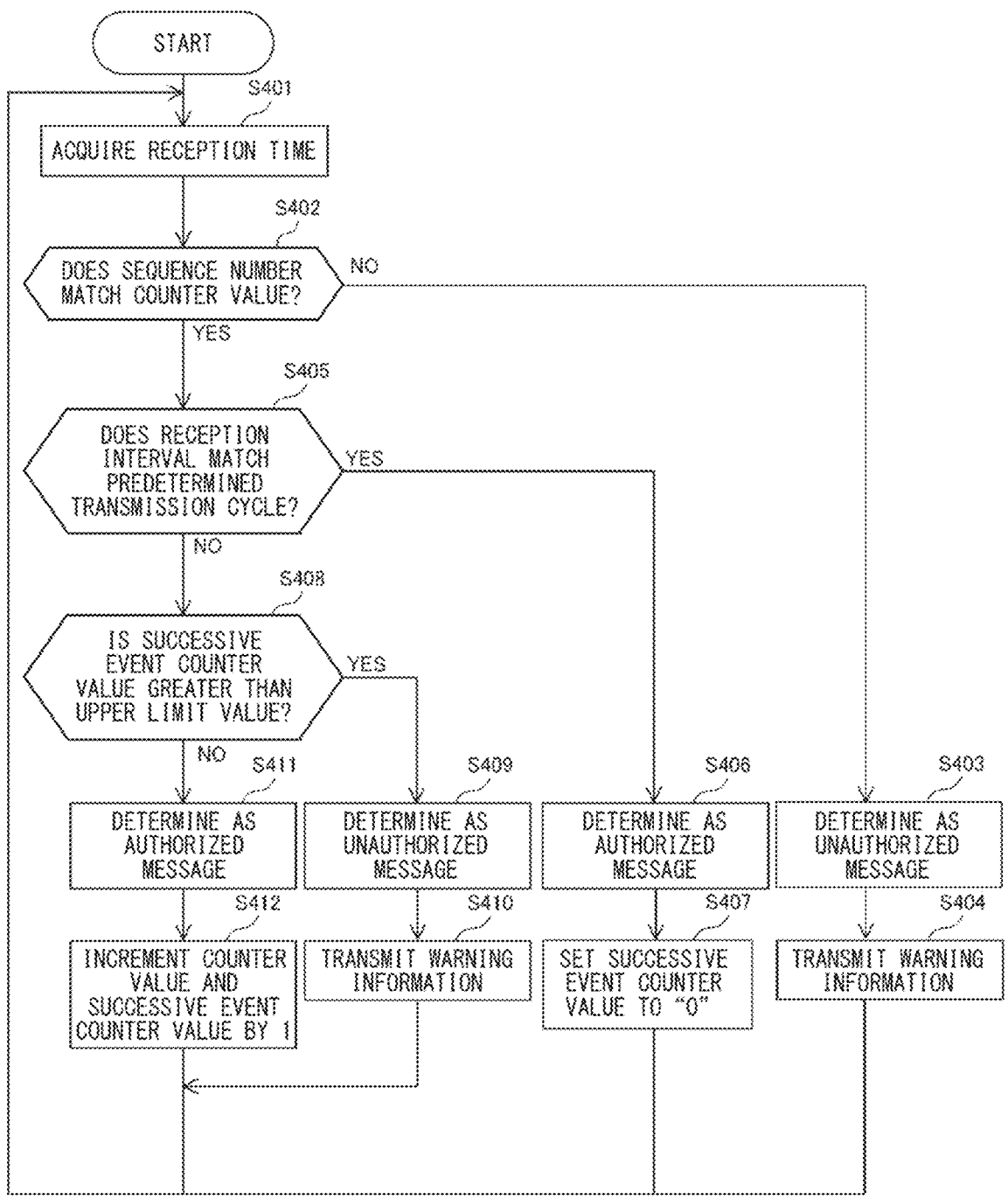
FIG. 16 is a flowchart of an example of an operation procedure when the gateway device performs a detection process in the in-vehicle communication system according to the third embodiment of the present disclosure.

FIG. 16 is a flowchart of an example of an operation procedure in which the gateway device performs a detection process in the in-vehicle communication system according to the third embodiment of the present disclosure. FIG. 16 shows a detection process for messages having a certain same message ID, and a similar detection process is performed on messages having another message ID.

With reference to FIG. 16, first, the gateway device 101 monitors a periodic message and an event message in the in-vehicle communication system 301, and acquires the reception times of the periodic message and the event message (step S401).

Next, the gateway device 101 acquires a sequence number of the received periodic message or event message, and a counter value in the counter unit 53. The gateway device 101 compares the acquired sequence number with the acquired counter value, and when the sequence number does not match the counter value (NO in step S402), determines that the received message is an unauthorized message (step S403).

Next, the gateway device 101 transmits warning information indicating that the unauthorized message is being transmitted through the bus 13, to the higher-order device located inside or outside the vehicle 1 (step S404), and continues monitoring of a periodic message and an event message in the in-vehicle communication system 301 (step S401).

Meanwhile, when the acquired sequence number matches the acquired counter value (YES in step S402), the gateway device 101 determines whether or not a reception interval between a currently received message and a message received last time, i.e., a message having a sequence number one count prior to the received message, matches the predetermined transmission cycle. When the reception interval matches the predetermined transmission cycle (YES in step S405), the gateway device 101 determines that the received message is an authorized message (step S406).

Next, the gateway device 101 sets the successive event counter value of the counter unit 53 to "0" (step S407), and continues monitoring of a periodic message and an event message in the in-vehicle communication system 301 (step S401).

Meanwhile, when the reception interval does not match the predetermined transmission cycle (NO in step S405), the gateway device 101 acquires, from the storage unit 55, the successive event counter value and the upper limit of the successive event counter value, and performs comparison. When the acquired successive event counter value is greater than the upper limit value (YES in step S408), the gateway device 101 determines that the received message is an unauthorized message (step S409).

Next, the gateway device 101 transmits warning information indicating that the unauthorized message is being transmitted through the bus 13, to the higher-order device located inside or outside the vehicle 1 (step S410), and continues monitoring of a periodic message and an event message in the in-vehicle communication system 301 (step S401).

Meanwhile, when the acquired successive event counter value is equal to or less than the upper limit value (NO in step S408), the gateway device 101 determines that the received message is an authorized message (step S411), and continues monitoring of a periodic message and an event message in the in-vehicle communication system 301 (step S401).

[Modification]

Figure 17:
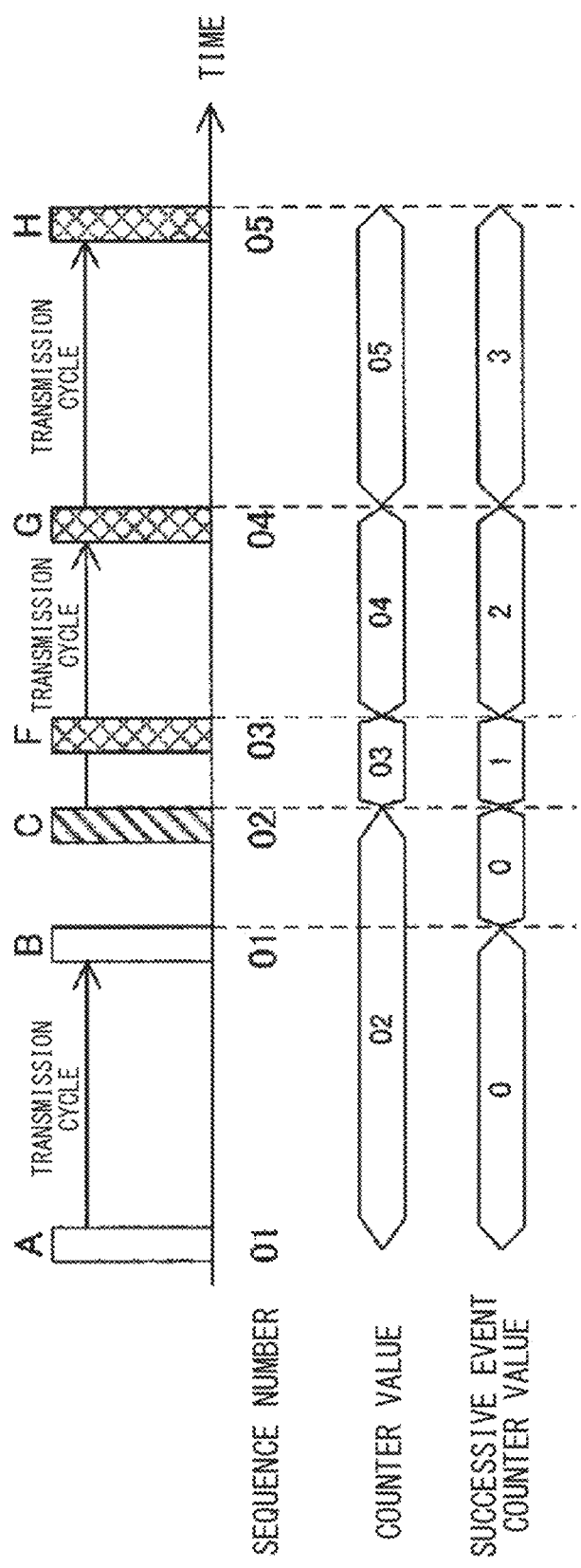
FIG. 17 shows an example of a case where a received message is determined to be an unauthorized message in the in-vehicle communication system according to a modification of the third embodiment of the present disclosure.

FIG. 17 shows an example of a case where a received message is determined to be an unauthorized message in the in-vehicle communication system according to a modification of the third embodiment of the present disclosure. FIG. 17 shows a case where the gateway device receives unauthorized messages F, G, H.

With reference to FIG. 17, in the example shown in FIG. 15, a sequence timber, which is not changed when a periodic message is transmitted and is changed each time an event message is transmitted, may be assigned to the message.

In this case, after the gateway device 101 has received the unauthorized message G, the successive event counter value in the counter unit 53 becomes "3" and exceeds the upper limit value. Therefore, even in this configuration, the detection unit 54 can detect an unauthorized message.

In the gateway device 101 according to the third embodiment of the present disclosure, the detection unit 54 counts the number of successively transmitted event messages, and detects an unauthorized message, based on the counting result. Therefore, for example, even when an unauthorized event message, the sequence number of which is adjusted to the counter value of the gateway device 101, is transmitted, the gateway device 101 can easily detect the unauthorized message. Thus, an unauthorized message in the in-vehicle communication system 301 can be more accurately detected.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

For example, in the in-vehicle communication system 301 according to the first to third embodiments described above, a certain control device 122A directly transmits a message to another control device in the in-vehicle network 12, However, in the in-vehicle communication system 301, the gateway device 101 may relay the message transmitted from the control device 122A, Specifically, with reference to FIG. 1, the gateway device 101 may receive a message from a bus connection device group 121 (control device 122A) via a bus 13, and may transmit the message to an in-vehicle communication device 111 via a bus 14. In this case, upon receiving the message from the control device 122A via the corresponding bus 13, the communication processing unit 51 in the gateway device 101 outputs a message reception notification to the monitoring unit 52 and the detection unit 54. Then, when a message ID included in the message received by the communication processing unit 51 matches the message stored in the storage unit 55, the monitoring unit 52 recognizes that the message received by the communication processing unit 51 is a message to be relayed, and acquires the reception time of the message by referring to the time stamp assigned to the message.

For example, in the in-vehicle communication system 301 according to the first to third embodiments, the gateway device 101 detects an unauthorized message in the in-vehicle communication system 301. However, in the in-vehicle communication system 301, a detection device other than the gateway device 101 may detect an unauthorized message in the in-vehicle communication system 301.

In the in-vehicle communication system 301 according to the first to third embodiments, the gateway device 101 serving as a detection device is provided separately from the control device 122A that transmits messages and the control device 122B that receives messages. However, a detection device may be included in an in-vehicle device that transmits messages or an in-vehicle device that receives messages.

In the in-vehicle communication system 301 according to the first to third embodiments, the gateway device 101 serving as a detection device is directly connected to the bus 13. However, the in-vehicle communication system 301 is not limited thereto.

Figure 18:
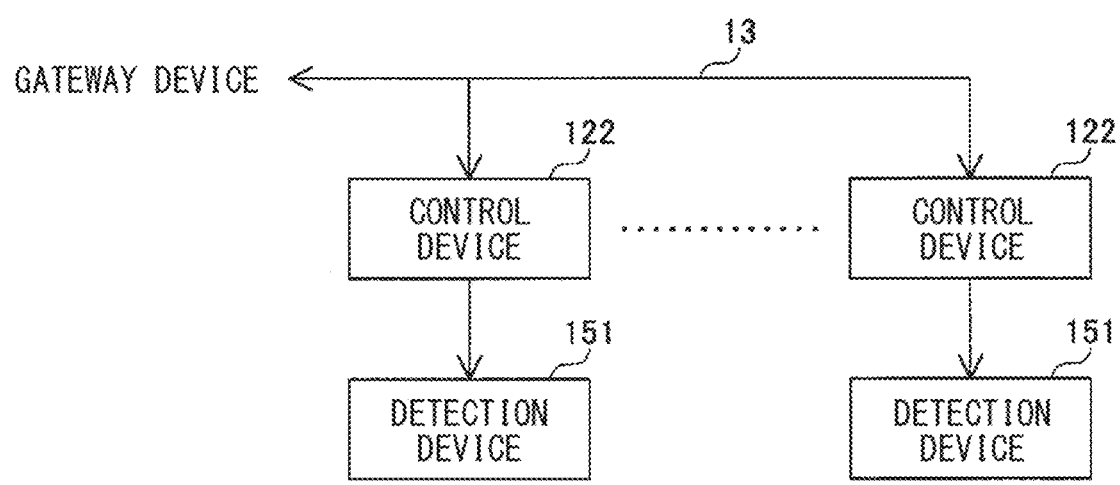
FIG. 18 shows an example of a connection topology of the in-vehicle network according to the embodiments of the present disclosure.

FIG. 18 shows an example of a connection topology of the in-vehicle communication system 301 according to the embodiments of the present disclosure.

With reference to FIG. 18, a detection device 151 may be connected to a bus 13 via an in-vehicle device, e.g., a control device 122. In this case, for example, the detection device 151 monitors messages transmitted/received by the in-vehicle device to detect an unauthorized message transmitted through the bus 13. The detection device 151 is connected to the in-vehicle device via a bus according to the Ethernet or CAN standard.

The operation of the detection device 151 is identical to that of the gateway device 101 in the in-vehicle communication system 301 according to the first and second embodiments. For example, the detection unit 54 in the detection device 151 compares a sequence number of a periodic message or an event message transmitted from the control device 122 with a counter value of the message, and performs provisional determination for detection of an unauthorized message, based on the comparison result. The detection unit 54 performs conclusive determination for detection of an unauthorized message, based on an interval of messages that satisfy a predetermined condition regarding the sequence number, among messages to which the same identification information is assigned, and on the predetermined transmission cycle of the periodic message.

Alternatively, the operation of the detection device 151 may be identical to that of the gateway device 101 in the in-vehicle communication system 301 according to the third embodiment. For example, the detection unit 54 in the detection device 151 counts the number of event messages successively transmitted from the control device and detects an unauthorized message, based on the counting result.

The above description includes the features in the additional note below

[Additional Note 1]

A detection device configured to detect an unauthorized message in an in-vehicle network, comprising:
 a monitoring unit configured to monitor a periodic message that is periodically transmitted and an event message that is non-periodically transmitted, as messages in the in-vehicle network, each message having, assigned thereto, identification information of a transmission source and a sequence number;
 a counter unit configured to change a counter value corresponding to the identification information, when the detection device has received the event message from the in-vehicle network; and
 a detection unit configured to compare the sequence number with the counter value, based on a result of monitoring by the monitoring unit, and perform provisional determination for detection of an unauthorized message, based on a result of the comparison, wherein
 the detection unit performs conclusive determination for detection of the unauthorized message, based on an interval of messages that satisfy a predetermined condition regarding the sequence number, among messages to which the same identification information is assigned, and on a predetermined transmission cycle of the periodic message, and
 the predetermined transmission cycle is a transmission cycle of the periodic message including a predetermined margin.

REFERENCE SIGNS LIST 1 vehicle
12 in-vehicle network
13, 14 bus
51 communication processing unit
52 monitoring unit
53 counter unit
54 detection unit
55 storage unit
101 gateway device
111 in-vehicle communication device
112 port
121 bus connection device group
122, 122A, 122B control device
131, 131A, 131B, 143 oscillator
132, 132A, 132B, 141 processor
133, 133A, 133B, 142 CAN transceiver
151 detection device
301 in-vehicle communication system

The invention claimed is:

1. A detection device configured to detect an unauthorized message in an in-vehicle network, comprising:
 circuitry configured to
 monitor a periodic message that is periodically transmitted and an event message that is non-periodically transmitted, as messages in the in-vehicle network, each message having, assigned thereto, identification information of a transmission source and a sequence number;
 change a counter value corresponding to the identification information, when the detection device has received the event message from the in-vehicle network; and
 compare, in a first step, the sequence number with the counter value, based on a result of monitoring by the circuitry, and perform provisional determination for detection of an unauthorized message, based on a result of the comparison, wherein
 conclusively determine, in a second step, the unauthorized message, based on an interval of messages that satisfy a predetermined condition regarding the sequence number, among messages to which the same identification information is assigned, and on a predetermined transmission cycle of the periodic message.

2. The detection device according to claim 1, wherein
 a first sequence number is assigned to each message as the sequence number of the message, the first sequence number being changed each time the periodic message or the event message is transmitted, and
 the circuitry changes the counter value when the detection device has received each of the periodic message and the event message.

3. The detection device according to claim 2, wherein
 the interval is a reception interval between a first message and a second message that has the first sequence number just prior to the first sequence number of the first message.

4. The detection device according to claim 1, wherein
a first sequence number is assigned to each message as the sequence number of the message, the first sequence number being changed each time the periodic message or the event message is transmitted, and the circuitry detects missing periodic messages, based on the result of the monitoring, corrects the counter value, based on the number of the missing periodic messages, compares the first sequence number with the corrected counter value, and performs provisional determination for detection of the unauthorized message, based on a result of the comparison.

5. The detection device according to claim 1, wherein
a second sequence number is assigned to each message as the sequence number of the message, the second sequence number being not changed when the periodic message is transmitted, and being changed each time the event message is transmitted, and the circuitry changes the counter value when the detection device has received the event message out of the periodic message and the event message.

6. The detection device according to claim 5, wherein
the interval is a reception interval between a third message and a fourth message that has a second sequence number equal to the second sequence number of the third message.

7. The detection device according to claim 6, wherein
the circuitry
transitions to a transient state after correcting, in the conclusive determination, a detection result regarding an unauthorized message in the provisional determination, and
in the transient state, detects the unauthorized message, based on a reception interval of messages that have been temporally successively received, among the messages to which the same identification information is assigned, and on the sequence numbers of the received messages.

8. The detection device according to claim 1, wherein the circuitry is configured to acquire a reception time of each message with reference to a time stamp assigned to the message, and associate the acquired reception time in association with the sequence number.

9. The detection device according to claim 1, wherein the circuitry provisionally determines detection of the unauthorized message when the sequence number and the counter value do not match.

10. The detection device according to claim 1, wherein the in-vehicle network is a controller area network (CAN).

11. The detection device according to claim 1, wherein the in-vehicle network is an ethernet network.

12. A detection method in a detection device that detects an unauthorized message in an in-vehicle network, the method comprising:
monitoring a periodic message that is periodically transmitted and an event message that is non-periodically transmitted, as messages in the in-vehicle network, each message having, assigned thereto, identification information of a transmission source and a sequence number;
changing a counter value corresponding to the identification information, when the detection device has received the event message from the in-vehicle network;
comparing, in a first step, the sequence number with the counter value, based on a result of the monitoring, and performing provisional determination for detection of an unauthorized message, based on a result of the comparison; and
performing, in a second step, conclusive determination for detection of the unauthorized message, based on an interval of messages that satisfy a predetermined condition regarding the sequence number, among messages to which the same identification information is assigned, and on a predetermined transmission cycle of the periodic message.

13. A non-transitory computer-readable storage medium having, stored therein, a detection program used by a detection device that detects an unauthorized message in an in-vehicle network, the program causing a computer to perform a method comprising:
monitoring a periodic message that is periodically transmitted and an event message that is non-periodically transmitted, as messages in the in-vehicle network, each message having, assigned thereto, identification information of a transmission source and a sequence number;
changing a counter value corresponding to the identification information, when the detection device has received the event message from the in-vehicle network;
comparing, in a first step, the sequence number with the counter value, based on a result of the monitoring, and performing provisional determination for detection of an unauthorized message, based on a result of the comparison; and
performing, in a second step, conclusive determination for detection of the unauthorized message, based on an interval of messages that satisfy a predetermined condition regarding the sequence number, among messages to which the same identification information is assigned, and on a predetermined transmission cycle of the periodic message.

* * * * *